US006754939B2

(12) United States Patent
Belden, Jr. et al.

(10) Patent No.: US 6,754,939 B2
(45) Date of Patent: Jun. 29, 2004

(54) EAS TAG HOLDER

(75) Inventors: Dennis D. Belden, Jr., Canton, OH (US); Frank H. Copen, Shreve, OH (US); David K. Huehner, Cuyahoga Falls, OH (US); Eric H. Mansfield, North Canton, OH (US); Debra I. Skolnicki, Vermilion, OH (US)

(73) Assignee: Alpha Security Products, Inc., North Canton, OH (US)

( * ) Notice: Subject to any disclaimer, the term of this patent is extended or adjusted under 35 U.S.C. 154(b) by 0 days.

(21) Appl. No.: 10/007,278

(22) Filed: Oct. 26, 2001

(65) Prior Publication Data

US 2002/0050033 A1 May 2, 2002

Related U.S. Application Data

(60) Provisional application No. 60/243,557, filed on Oct. 26, 2000, and provisional application No. 60/294,469, filed on May 30, 2001.

(51) Int. Cl.[7] .................................................. F16B 21/00

(52) U.S. Cl. ...................................................... 24/704.1

(58) Field of Search .......................... 24/487, 532, 542, 24/543, 545, 570, 704.9, 704.2; 70/57.1; 206/1.5; 292/307 A

(56) References Cited

U.S. PATENT DOCUMENTS 1,964,847 A 7/1934 Engler et al.
3,698,681 A * 10/1972 Lacey ......................... 251/10
3,713,622 A * 1/1973 Dinger ........................ 251/10
3,724,890 A 4/1973 Adamson et al.
3,755,859 A * 9/1973 Solari ....................... 24/16 PB
3,858,280 A 1/1975 Martens
3,911,534 A 10/1975 Martens et al.
3,914,829 A 10/1975 Paskert
3,932,918 A 1/1976 Paskert
3,942,829 A 3/1976 Humble et al.
3,947,930 A 4/1976 Martens et al.
3,974,581 A 8/1976 Martens et al.
3,982,307 A * 9/1976 Smith et al. .................. 24/545
3,995,900 A 12/1976 Humble et al.
4,000,543 A 1/1977 Paskert
4,008,512 A * 2/1977 Prodel ...................... 24/16 PB
4,012,813 A 3/1977 Martens et al.
4,103,295 A 7/1978 Doerre
4,104,622 A 8/1978 Van Niel
4,187,509 A 2/1980 Weiner
4,196,424 A 4/1980 Williamson
4,221,025 A 9/1980 Martens et al.
4,299,870 A 11/1981 Humble (List continued on next page.)

FOREIGN PATENT DOCUMENTS

DE 200 14 860 U1 11/2000
FR 2 594 164 A1 2/1986
GB 2 176 748 A 1/1987

*Primary Examiner*—J. J. Swann
*Assistant Examiner*—Ruth G. Rodriguez
(74) *Attorney, Agent, or Firm*—Sand & Sebolt

(57) ABSTRACT

An EAS tag holder includes a first member and a second member are hinged together between open and closed positions. In one embodiment of the invention, the holder includes a pin that pierces a portion of the item of merchandise to lock the holder to the item of merchandise. In other embodiments, the holder clamps itself to the item of merchandise. The holder is removed from the merchandise by cutting the hinge of the holder and sliding the first and second members apart. In another embodiment of the invention, the first and second members of the holder are held together by locking fingers that may be released with a specially-designed key so that the holder may be reused. In another embodiment of the invention, the holder is opened with a key that breaks the locking fingers to release the members from each other.

40 Claims, 34 Drawing Sheets

U.S. PATENT DOCUMENTS

| | | | | | |
|---|---|---|---|---|---|
| 4,311,992 | A | | 1/1982 | DeChant | |
| 4,380,097 | A | | 4/1983 | Keifer | |
| 4,416,038 | A | * | 11/1983 | Morrone, III | 24/487 |
| 4,483,049 | A | | 11/1984 | Gustavsson et al. | |
| 4,502,717 | A | | 3/1985 | Close | |
| 4,523,356 | A | | 6/1985 | Charlot, Jr. | |
| 4,531,264 | A | | 7/1985 | Minasy | |
| 4,590,461 | A | | 5/1986 | Cooper | |
| 4,603,453 | A | | 8/1986 | Yokoyama | |
| 4,649,397 | A | | 3/1987 | Heaton et al. | |
| 4,651,136 | A | | 3/1987 | Anderson et al. | |
| 4,670,950 | A | | 6/1987 | Wisecup et al. | |
| 4,685,234 | A | | 8/1987 | Anderson et al. | |
| 4,695,845 | A | | 9/1987 | Hildt | |
| 4,722,119 | A | | 2/1988 | Green | |
| 4,745,664 | A | | 5/1988 | Damvig | |
| 4,751,500 | A | | 6/1988 | Minasy et al. | |
| 4,774,503 | A | | 9/1988 | Bussard | |
| 4,774,504 | A | | 9/1988 | Hartings | |
| 4,847,592 | A | | 7/1989 | Hogen Esch et al. | |
| 4,884,833 | A | | 12/1989 | Pedersen | |
| 4,903,383 | A | | 2/1990 | Gartshore | |
| 4,940,968 | A | | 7/1990 | De Nood | |
| 4,944,075 | A | | 7/1990 | Hogan | |
| 4,987,754 | A | | 1/1991 | Minasy et al. | |
| 4,991,413 | A | | 2/1991 | Arnaldo | |
| 4,993,245 | A | | 2/1991 | Ott | |
| 5,022,244 | A | | 6/1991 | Charlot, Jr. | |
| 5,027,480 | A | * | 7/1991 | Hogarth | 24/543 |
| 5,031,287 | A | | 7/1991 | Charlot, Jr. et al. | |
| 5,054,172 | A | | 10/1991 | Hogan et al. | |
| 5,068,641 | A | | 11/1991 | Hogen Esch | |
| 5,069,047 | A | | 12/1991 | Lynch et al. | |
| 5,077,872 | A | | 1/1992 | Guthammar | |
| 5,079,540 | A | | 1/1992 | Narlow et al. | |
| 5,088,165 | A | | 2/1992 | Minasy et al. | |
| 5,099,228 | A | | 3/1992 | Israel et al. | |
| 5,140,836 | A | | 8/1992 | Hogan et al. | |
| 5,144,820 | A | | 9/1992 | Holmgren | |
| 5,184,377 | A | | 2/1993 | Ragsdale et al. | |
| 5,205,024 | A | | 4/1993 | Willard | |
| 5,208,580 | A | | 5/1993 | Crossfield | |
| 5,275,122 | A | | 1/1994 | Stolz et al. | |
| 5,309,740 | A | | 5/1994 | Hansen | |
| 5,367,289 | A | | 11/1994 | Baro et al. | |
| 5,388,433 | A | | 2/1995 | Andersson et al. | |
| 5,392,620 | A | | 2/1995 | Stoltz et al. | |
| 5,426,419 | A | | 6/1995 | Nguyen et al. | |
| 5,428,875 | A | | 7/1995 | Nguyen et al. | |
| 5,437,172 | A | | 8/1995 | Lamy et al. | |
| 5,438,738 | A | | 8/1995 | Stolz et al. | |
| 5,497,639 | A | | 3/1996 | Charlot, Jr. | |
| 5,524,463 | A | | 6/1996 | Schenkel et al. | |
| 5,528,914 | A | | 6/1996 | Nguyen et al. | |
| 5,535,606 | A | | 7/1996 | Nguyen et al. | |
| RE35,361 | E | | 10/1996 | Hogan et al. | |
| 5,572,191 | A | | 11/1996 | Lundberg | |
| 5,600,977 | A | | 2/1997 | Piron | |
| 5,645,167 | A | * | 7/1997 | Conrad | 206/361 |
| 5,647,106 | A | | 7/1997 | Hogan | |
| 5,655,392 | A | | 8/1997 | Holmgren | |
| 5,657,518 | A | * | 8/1997 | Hunt | 24/543 |
| 5,680,681 | A | | 10/1997 | Fuss | |
| 5,689,860 | A | * | 11/1997 | Matoba et al. | 24/115 F |
| 5,745,965 | A | | 5/1998 | Stoltz et al. | |
| 5,791,079 | A | | 8/1998 | Mazzucchelli | |
| 5,823,341 | A | * | 10/1998 | Nakasuji | 206/387.11 |
| 5,841,349 | A | | 11/1998 | Holmgren | |
| 5,850,752 | A | * | 12/1998 | Lax | 70/276 |
| 5,852,856 | A | | 12/1998 | Seidel | |
| 5,942,978 | A | | 8/1999 | Shafer | |
| 5,953,799 | A | | 9/1999 | Seidel | |
| 5,955,951 | A | | 9/1999 | Wischerop et al. | |
| 5,969,614 | A | | 10/1999 | Holmgren | |
| 6,023,951 | A | | 2/2000 | Maurer et al. | |
| 6,029,322 | A | | 2/2000 | Belotti et al. | |
| 6,052,876 | A | | 4/2000 | Hogan et al. | |
| 6,082,572 | A | * | 7/2000 | Galton-Fenzi et al. | 220/315 |
| 6,108,875 | A | * | 8/2000 | Anscher | 24/198 |
| 6,137,413 | A | | 10/2000 | Ryan, Jr. | |
| 6,182,480 | B1 | * | 2/2001 | Kim | 70/57.1 |
| 6,188,320 | B1 | | 2/2001 | Kolton et al. | |
| 6,226,839 | B1 | | 5/2001 | Sayegh | |
| 6,255,950 | B1 | | 7/2001 | Nguyen | |
| 6,321,905 | B1 | * | 11/2001 | Sykes | 206/1.5 |
| 6,474,470 | B2 | * | 11/2002 | Byrne et al. | 206/308.2 |

* cited by examiner

EAS TAG HOLDER

CROSS REFERENCE TO RELATED APPLICATIONS

This application claims priority from pending U.S. Provisional Patent Application No. 60/243,557 filed Oct. 26, 2000, and from pending U.S. Provisional Patent Application No. 60/294,469 filed May 30, 2001; the disclosures of which are incorporated herein by reference.

BACKGROUND OF THE INVENTION

1. Technical Field

The present invention generally relates to anti-shoplifting security devices that hold an EAS tag to an item of merchandise. More particularly, the present invention relates to EAS tag holders that may be removed from an item of merchandise and discarded.

2. Background Information

Merchandise lost to shoplifting is a well known problem faced by retail establishments. One anti-shoplifting system tags each article of merchandise with an electronic article surveillance (EAS) tag that activates an alarm when the EAS tag passes near a sensor that is typically positioned at the exit to the retail establishment.

One common type of EAS tag is a removable tag that is removed by the sales clerk and reused by the retail establishment on a different article of merchandise. The process of removing the EAS tag and reusing the EAS tag takes time and is undesired in some retail establishments. These retail establishments do not wish to be responsible for reinstalling used EAS tags on new items of merchandise. The retail establishments desire that the tags come with the merchandise and can be sold with the merchandise to the customers. The tags are then removed from the merchandise by the consumer after the merchandise is removed from the retail establishment.

Other retail establishments desire disposable tags that may be quickly attached to and detached from an item of merchandise. Once used and detached, the tag may be thrown away. In this type of system, the retail establishment may require that certain merchandise be delivered to the retail establishment with the tags attached. The sales clerk would then detach the tag and throw it away thus eliminating most of the work now performed by the retail establishment.

SUMMARY OF THE INVENTION

The invention provides a disposable EAS tag holder that is locked to an item of merchandise until a portion of the EAS tag holder is destroyed. The EAS tag holder is designed to have one component that is easily destroyed by the consumer after the consumer takes the merchandise home. In one embodiment, the holder includes a hinge that may be severed by a common household tool such as a pair of scissors. After the hinge is severed, the members of the holder are slid apart to unlock the holder.

The invention also provides an EAS tag holder having a body that has locking fingers that hold first and second members of the holder together. The holder is removed from an item of merchandise by using a key that breaks the locking fingers to release the first and second members.

The invention also provides an EAS tag holder that is attached to the item of merchandise with a clamping force. Another embodiment of the EAS tag holder provides a tooth that is designed to pierce or clamp against the item of merchandise.

The invention also provides an EAS tag holder that has locking fingers that hold first and second members of the holder together until they are unlocked with a key pin that engages the locking fingers from a direction that is parallel to the pivot axis of the hinge that connects the first and second members. In one embodiment, the invention provides a holder configuration wherein the key pins slide into sides of the holder to engage the locking fingers. The invention also provides a key that allows the user to unlock the holder by pushing down on a plunger that simultaneously pushes the key pins into the sides of the holder.

BRIEF DESCRIPTION OF THE SEVERAL VIEWS OF THE DRAWINGS

The preferred embodiments of the invention, illustrative of the best mode in which applicant contemplated applying the principles of the invention, are set forth in the following description and are shown in the drawings and are particularly and distinctly pointed out and set forth in the appended Claims.

Similar numbers refer to similar parts throughout the specification.

DETAILED DESCRIPTION OF THE INVENTION

Figure 1:
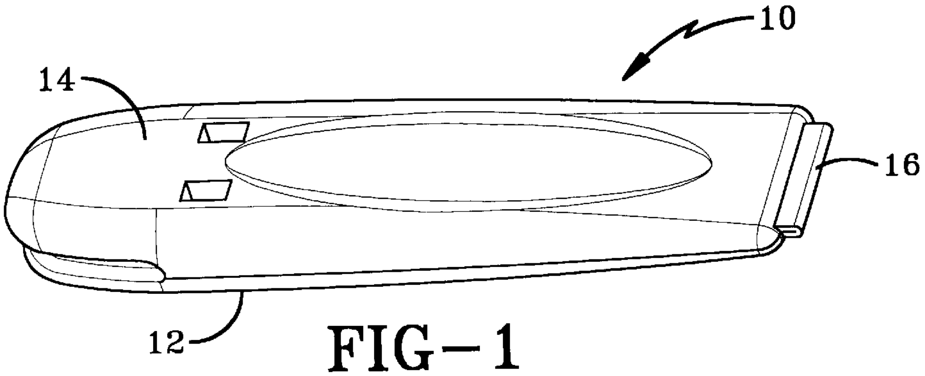
FIG. 1 is a perspective view of the first embodiment of the disposable EAS tag holder of the present invention.
Figure 2:
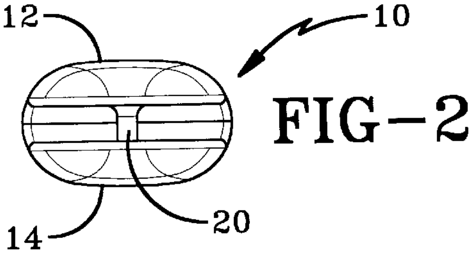
FIG. 2 is an end view of the holder of FIG. 1.
Figure 3:
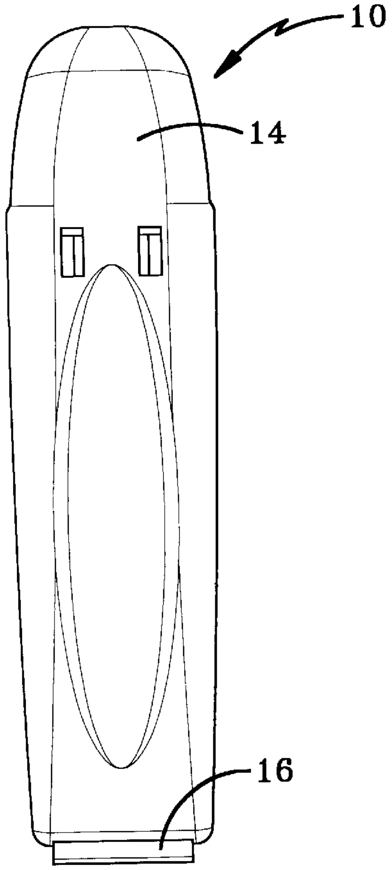
FIG. 3 is a top view of FIG. 1.
Figure 4:
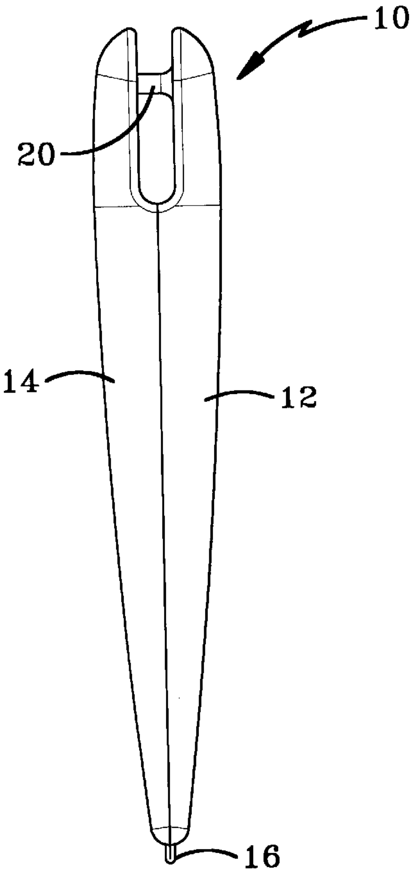
FIG. 4 is a side view of FIG. 1.
Figure 5:
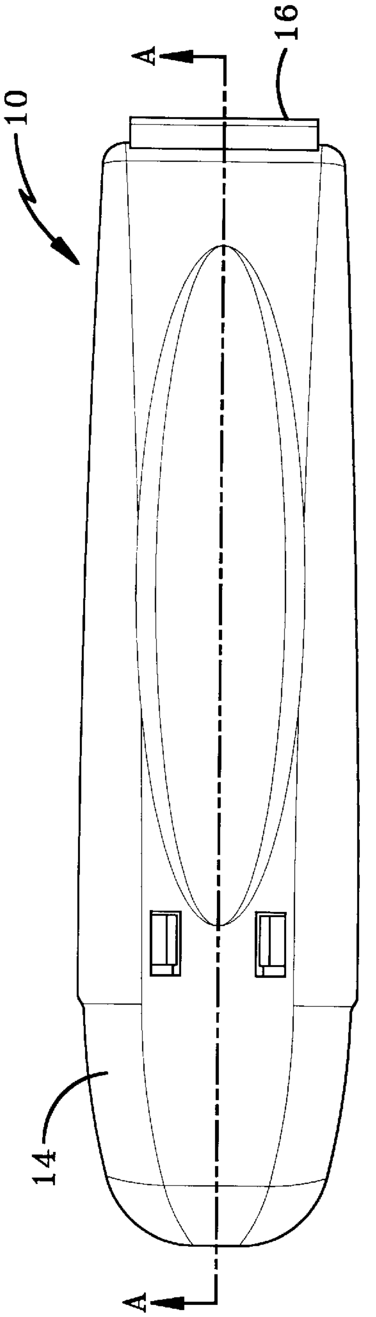
FIG. 5 is an enlarged top view of FIG. 1.
Figure 6:
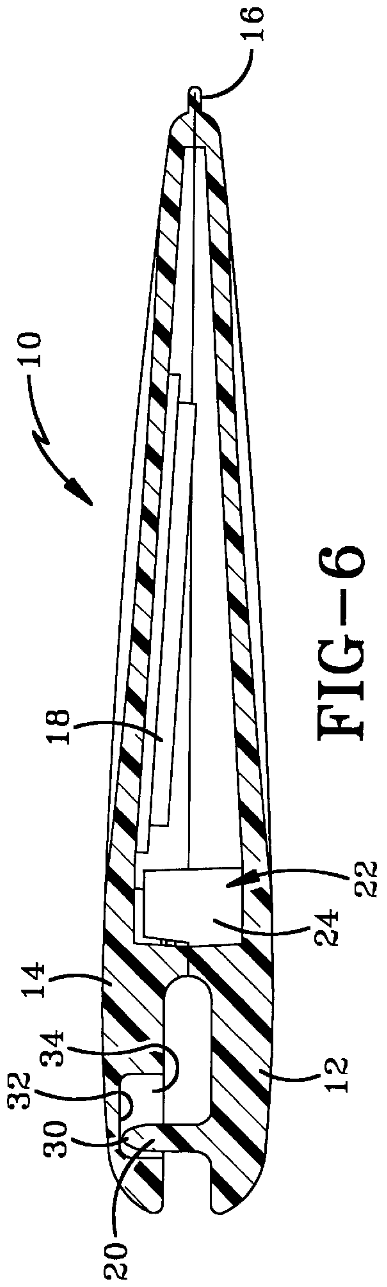
FIG. 6 is a section view taken along line A—A of FIG. 5.
Figure 7:
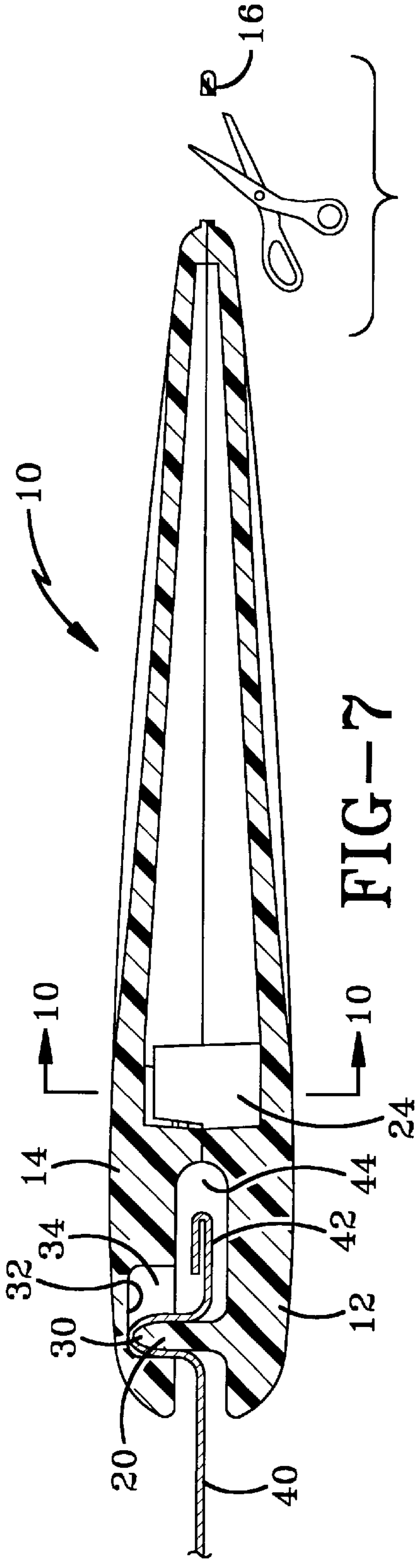
FIG. 7 is a section view similar to FIG. 6 showing the hinge of the holder being removed with a pair of scissors.
Figure 8:
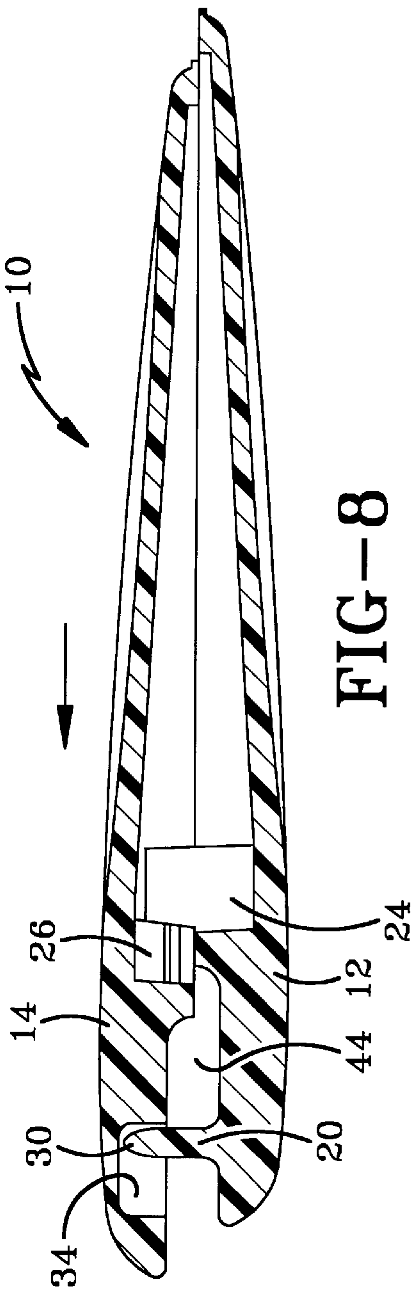
FIG. 8 is a section view similar to FIG. 6 showing the second member of the holder being moved relative to the first member of the holder.
Figure 9:
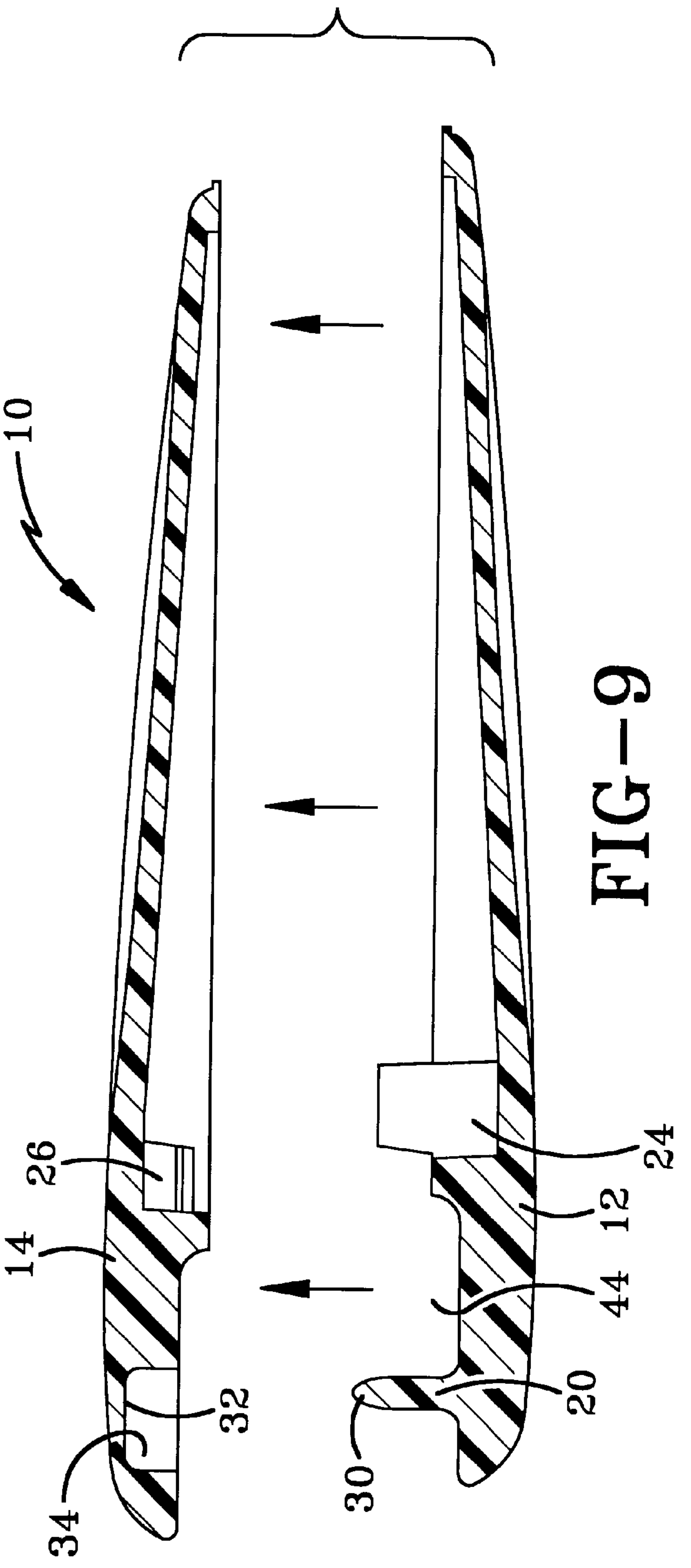
FIG. 9 is a section view similar to FIG. 6 showing the first and second members of the holder being separated.
Figure 11:
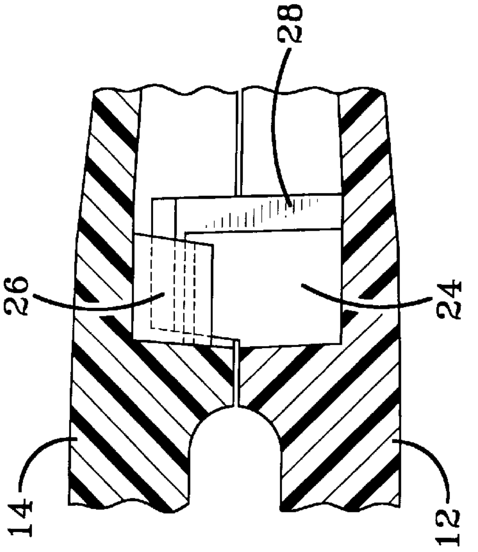
FIG. 11 is a section view taken along line 11—11 of FIG. 10.
Figure 10:
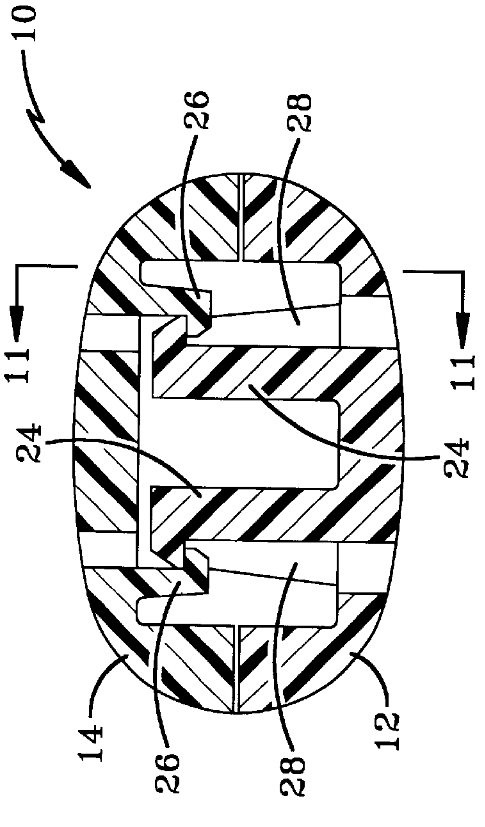
FIG. 10 is a section view taken along line 10—10 of FIG. 7.

The first embodiment of the EAS tag holder of the present invention is indicated generally by the numeral 10 in FIGS. 1–11. EAS tag holder 10 generally includes first and second members 12 and 14 connected together by a hinge 16. Hinge 16 is preferably a living hinge that hingedly connects members 12 and 14 between an opened, unlocked position and a closed, locked position. EAS tag holder 10 functions by securely holding an EAS tag 18 between members 12 and 14 where it cannot be accessed when members 12 and 14 are in the locked position. EAS tag holder 10 includes a tooth 20 that secures EAS tag holder 10 to a substrate 40. Substrate 40 may be a flexible layer of material such as a layer of fabric or a section of clothing. Substrate 40 may also be any of a variety of items of merchandise that can accept tooth 20. EAS tag holder 10 may thus be locked to substrate 40 in order to secure an EAS tag to substrate 40 such that an alarm will sound if substrate 40 is passed near an alarm configured to sense EAS tag 18. EAS tag holder 10 is removed from substrate 40 by the consumer after the consumer leaves the retail establishment. EAS tag holder 10 is configured to be easily removed by the consumer by configuring hinge 16 in a manner that allows the consumer to sever hinge 16 with a pair of scissors as shown in FIG. 7. Once hinge 16 is severed, members 12 and 14 may be separated as shown in FIG. 9 and discarded.

Members 12 and 14 are locked together with a locking mechanism 22 that generally includes a pair of first locking fingers 24 and a pair of second locking fingers 26. Locking fingers 24 and 26 are configured to snap together in a one way snap fit connection when members 12 and 14 are moved from the unlocked position to the locked position. To facilitate the one way snap fit engagement, each locking finger 24 and 26 includes an angled surface. The angled surfaces are positioned to engage each other to allow fingers 24 and 26 to slide over each other. Each locking finger 24 and 26 also includes a locking surface that engages the locking surface of the corresponding locking finger to prevent the locking fingers 24 and 26 from being pulled apart once they are snapped into the locked position.

In one embodiment of the invention, locking fingers 24 include a blocking wall 28 that prevents locking fingers 26 from sliding out of engagement with locking fingers 24. Blocking walls 28 are disposed toward hinge 16. In other embodiments of the invention, blocking wall 28 may be spaced from locking fingers 24.

Tooth 20 extends from member 12 and includes an outer end 30 that is disposed immediately adjacent a wall portion of second member 14 when EAS tag holder 10 is in the locked position. The wall that lies closely adjacent outer end 30 is the bottom wall 32 of a concave depression 34 defined by second member 14. Concave depression 34 has a width larger than the thickness of tooth 20 so that tooth 20 and a portion of substrate 40 may be positioned in depression 34. The length of depression 34 is configured to allow locking fingers 24 and 26 to disengage each other when slid with respect to each other as depicted in FIG. 8. In the embodiment depicted in FIG. 8, member 14 is slid to the left with respect to member 12 such that tooth 20 moves from the left side of depression 34 to the right side of depression 34. When members 12 and 14 are slid in this manner, locking fingers 24 and 26 disengage with each other and members 12 and 14 may be pulled apart.

Holder 10 is used by placing substrate 40 over tooth 20 and then closing member 14 over tooth 20 until locking fingers 24 and 26 engage to hold members 12 and 14 together. In this position, substrate 40 is clamped between tooth 20 and member 14 in depression 34. The clamping force prevents substrate 40 from being removed from holder 10. In some situations, substrate 40 will include a bead 42 that may be disposed in an elongated opening 44. Bead 42 cannot be pulled back over tooth 20 thus further locking substrate 40 in holder 10.

The consumer who purchases substrate 40 removes EAS tag holder 10 by cutting hinge 16 with a pair of scissors or a knife. Once hinge 16 is severed, members 12 and 14 may slide relative to each other as depicted in FIG. 8. The sliding movement allows fingers 24 and 26 to disengage. Once disengaged, members 12 and 14 may be separated to release holder 10 from substrate 40.

Figure 12:
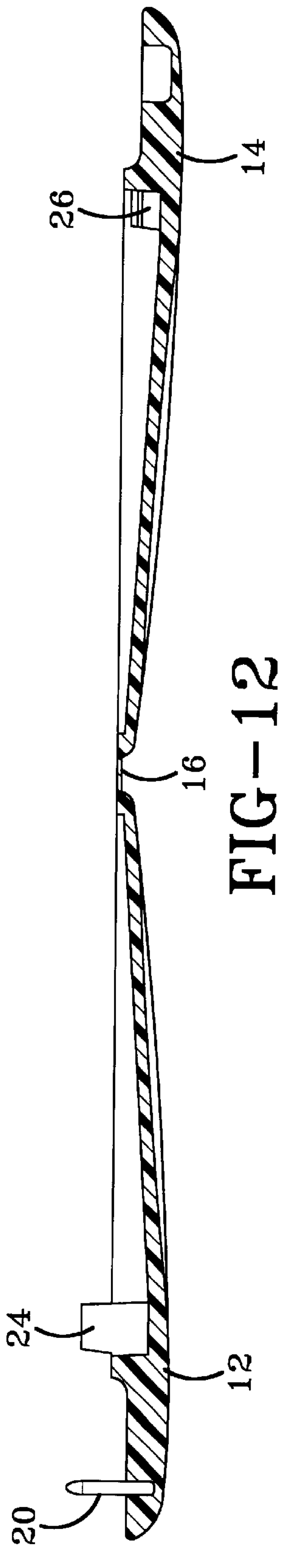
FIG. 12 is a section view similar to FIG. 6 showing a second embodiment of the EAS tag holder in an open configuration.

FIG. 12 depicts the second embodiment of the EAS tag holder of the invention wherein tooth 20 includes a sharp end. In the second embodiment, the tooth may pierce article 40 to secure holder 10 to substrate 40. Tooth 20 may be fabricated from a metal, a plastic, a ceramic, or any other material known to those skilled in the art.

Figure 13:
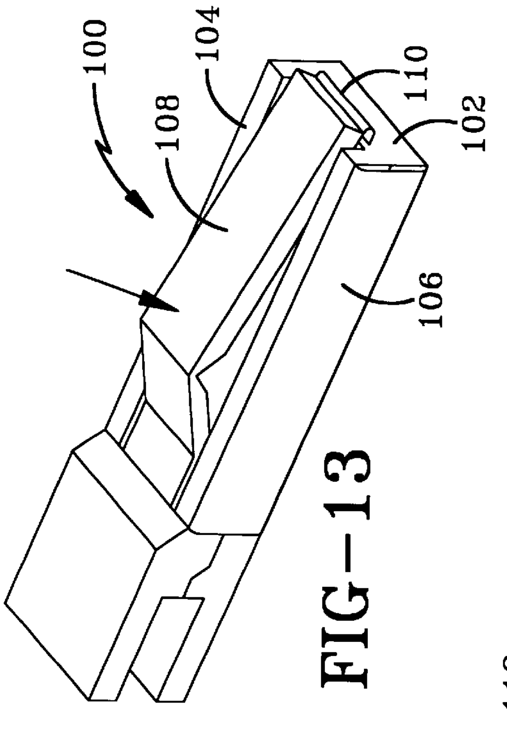
FIG. 13 is a perspective view of a third embodiment of a disposable EAS tag holder in an unlocked configuration.
Figure 14:
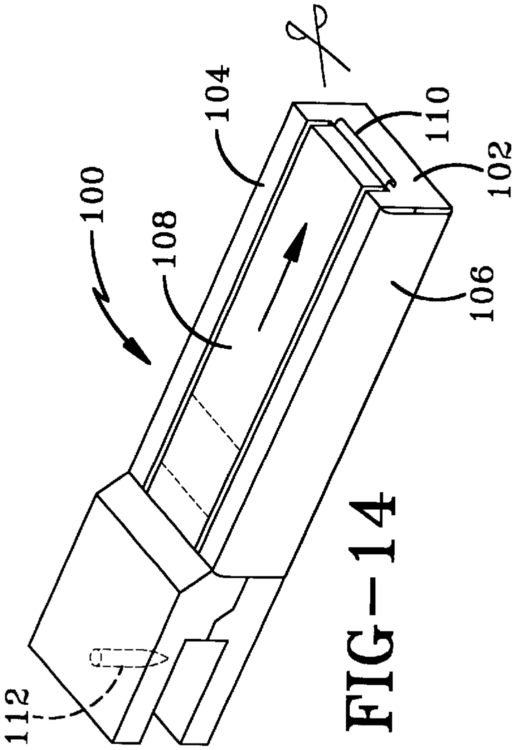
FIG. 14 is a perspective view similar to FIG. 13 showing the third embodiment of the disposable EAS tag holder in a locked configuration.
Figure 14A:
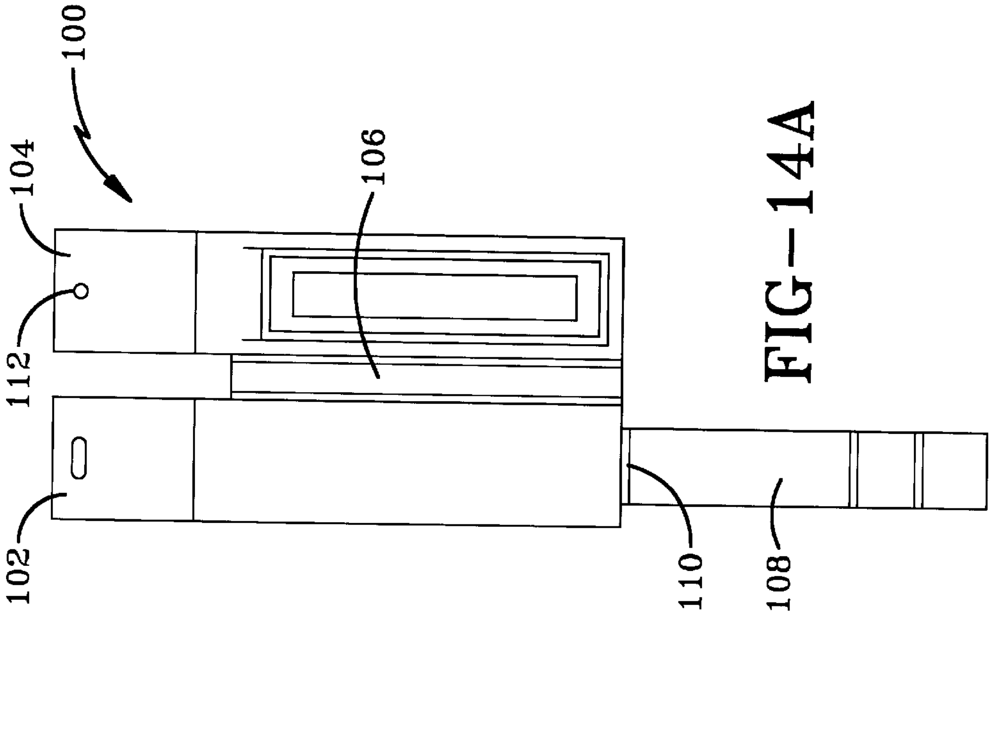
FIG. 14A is a view of the third embodiment of the EAS tag holder in an unfolded configuration.

The third embodiment of the EAS tag holder is indicated generally by the numeral 100 in FIGS. 13, 14, and 14A. EAS tag holder 100 generally includes a first member 102 and a second member 104 that are hinged together with a hinge 106. Hinge 106 may include a pair of living hinges and a hinge wall member. EAS tag holder 100 may include a slide 108 that is movable between unlocked and locked positions as depicted in FIGS. 13 and 14. Slide 108 locks members 102 and 104 together when slide 108 is in a locked position and allows members 102 and 104 to be separated when slide 108 is in the unlocked position. Slide 108 is hinged to member 102 by hinge 110.

EAS tag holder 100 clamps onto article 40 in the same manner described above with respect to the first and second embodiments of the EAS tag holder. EAS tag holder 100 may include a clamping tooth 112 or a piercing tooth 112.

Slide 108 includes a plurality of hinges that allow slide 108 to be shortened and inserted into an opening defined by member 104. The opening is at the opposite end of member 104 than hinge 110. When the end of slide 108 is inserted in the opening, the end of slide 108 engages portions of member 102 to prevent members 102 and 104 from being separated. This position is the locked position and is depicted in FIG. 14.

Members 102 and/or 104 include locking fingers that engage corresponding locking fingers on slide 108 to hold slide 108 in the locked position depicted in FIG. 14. When the user desires to remove EAS tag holder 100 from article 40, the user cuts hinge 110 and disengages the locking fingers allowing slide 108 to be removed from the opening thus allowing members 102 and 104 to be moved apart.

Figure 15:
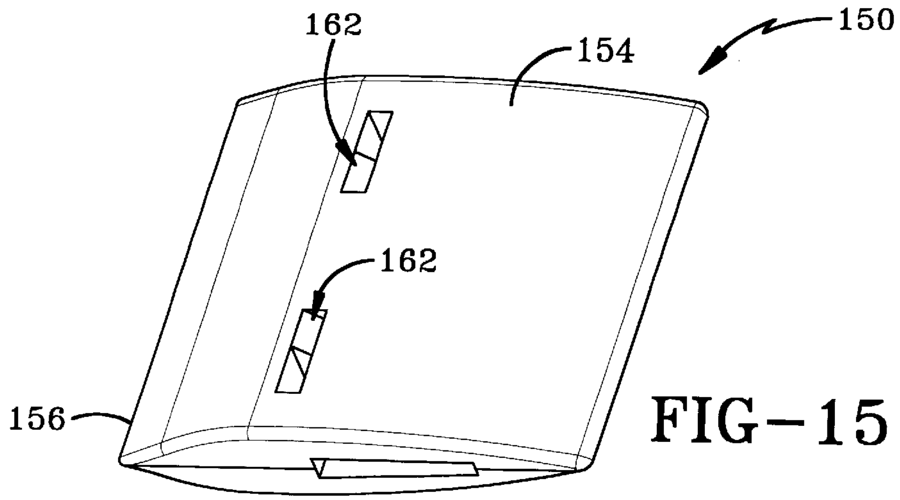
FIG. 15 is a perspective view of a fourth embodiment of a disposable EAS tag holder.
Figure 16:
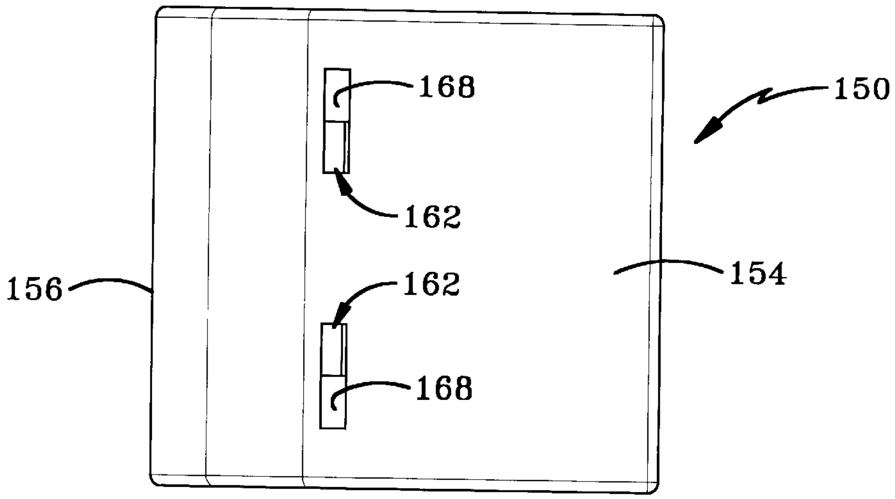
FIG. 16 is a top plan view of FIG. 15.
Figure 17:
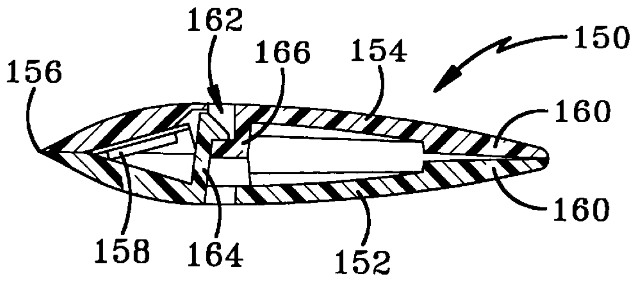
FIG. 17 is a section view taken along line A—A of FIG. 16.

The fourth embodiment of the EAS tag holder of the present invention is indicated generally by the numeral 150 in FIGS. 15, 16 and 17. EAS tag holder 150 includes a first member 152 and a second member 154 that are connected together by a hinge 156. Members 152 and 154 are configured to hold an EAS tag 158 in a location where EAS tag 158 cannot be readily accessed by the potential shoplifter. Members 152 and 154 are configured to clamp onto a flexible substrate and include gripping jaws 160 for frictionally holding the substrate once clamped on the substrate.

Members 152 and 154 are held in the clamped position by a locking mechanism 162 that includes cooperating locking fingers 164 and 166. Members 152 and 154 define openings 168 adjacent each finger 164 and 166 so that a user may insert a pry bar such as a flathead screwdriver into openings 168 to break fingers 164 and 166 or disengage fingers 164 and 166 from one another so that members 152 and 154 may be separated to release the flexible substrate.

Figure 18:
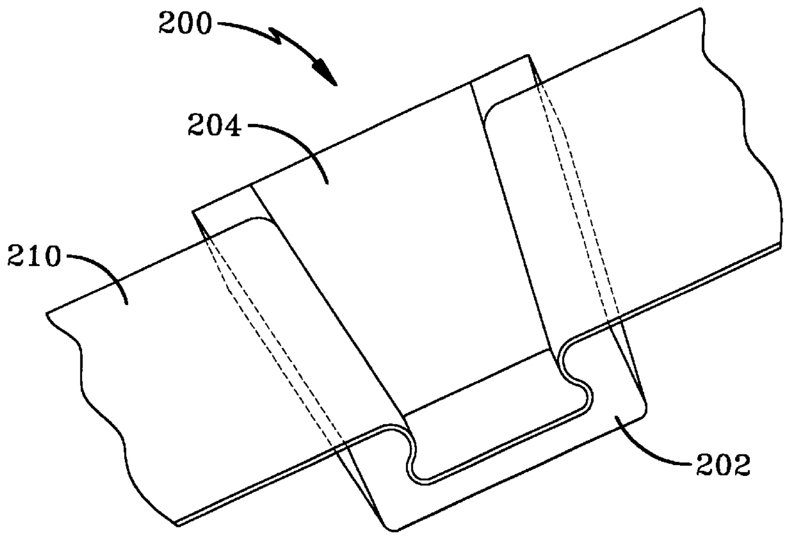
FIG. 18 is a perspective view of a fifth embodiment of the disposable EAS tag holder of the present invention.
Figure 19:
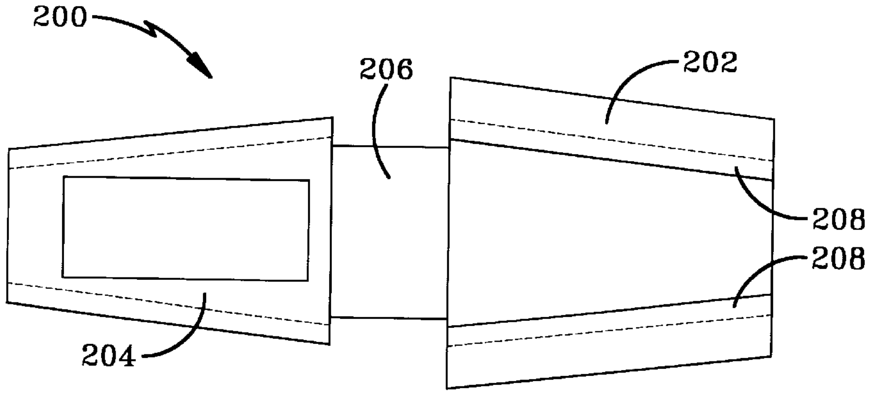
FIG. 19 is a top plan view of the disposable EAS tag holder of FIG. 18 in an open configuration.

The fifth embodiment of the EAS tag holder of the present invention is indicated generally by the numeral 200 in FIGS. 18 and 19. EAS tag holder 200 includes a base 202 and a wedge 204 that are connected together by a hinge 206. One of base 202 and wedge 204 includes a recess for holding an EAS tag. Wedge 204 is designed to slide into base 202. Base 202 includes angled sidewalls 208 that prevent wedge 204 from being lifted directly out of base 202 once wedge 204 is slid into base 202.

EAS tag holder 200 functions by placing a flexible substrate 210 on base 202 and sliding wedge 204 over substrate 210 and into base 202. Substrate 210 is thus frictionally trapped between wedge 204 and base 202. The friction between the three elements prevents wedge 204 from being removed until holder 200 is at least partially destroyed by a user. Locking fingers may also be used to hold the two elements together.

Figure 20:
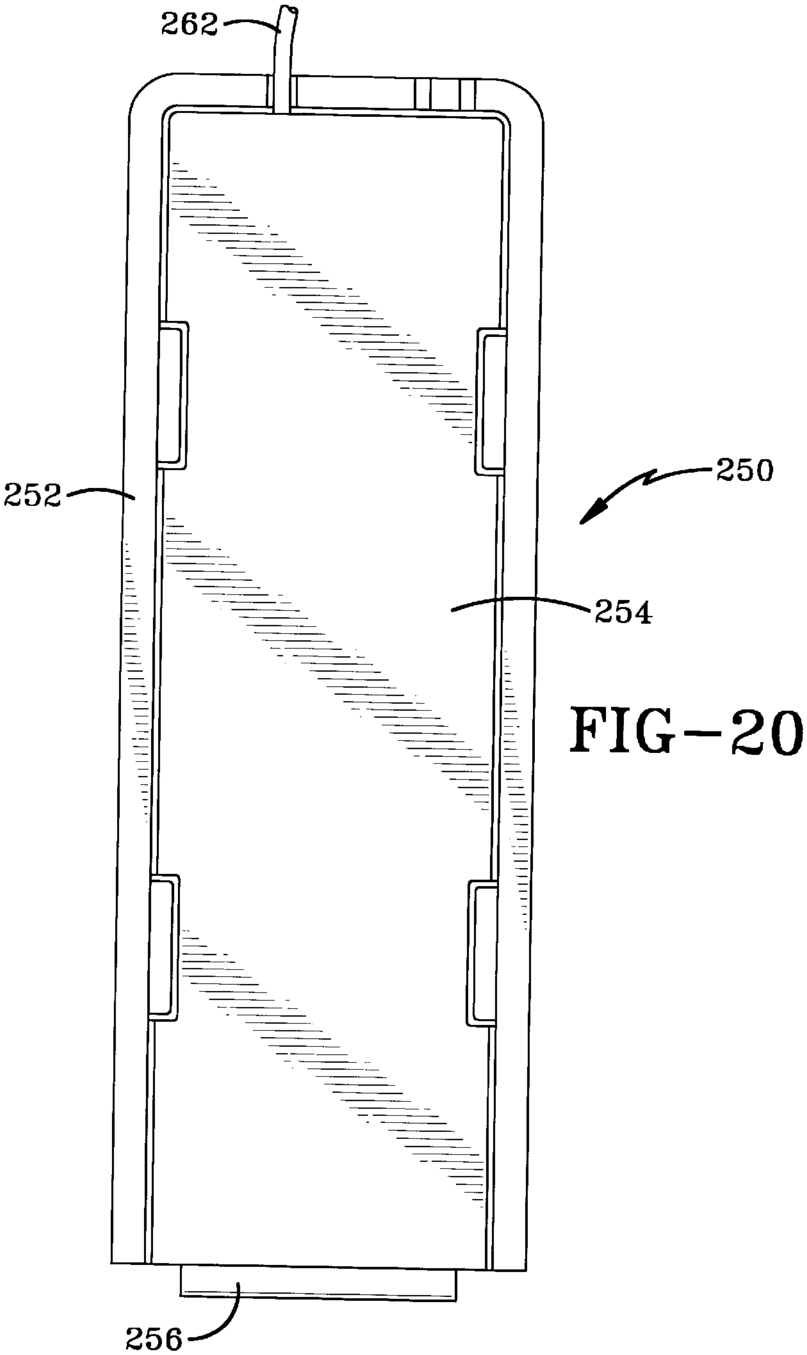
FIG. 20 is a top plan view of the sixth embodiment of the disposable EAS tag holder of the present invention.
Figure 21:
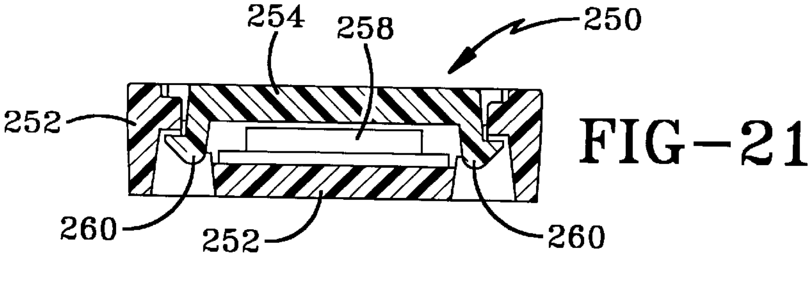
FIG. 21 is a section view taken along line A—A of FIG. 20.
Figure 22A:
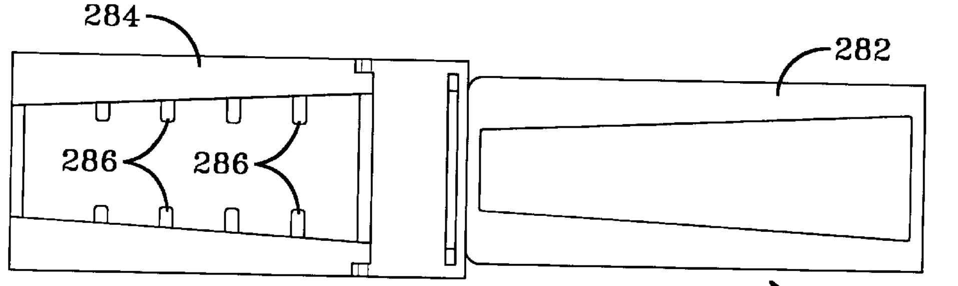
FIGS. 22A–E depicts different views of a seventh embodiment of the disposable EAS tag holder of the present invention.
Figure 22B:
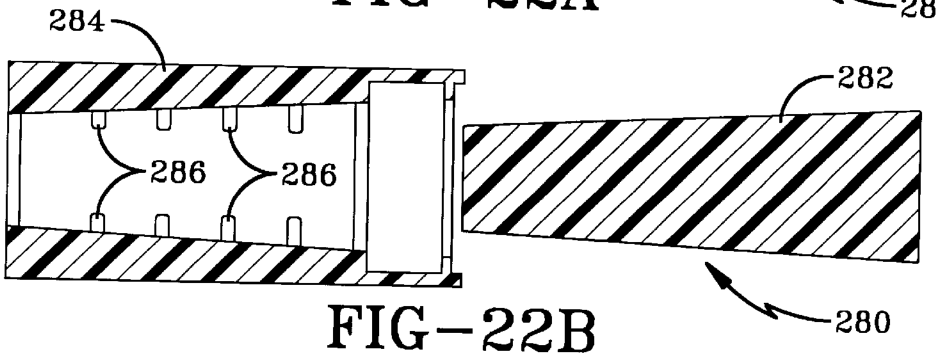
Figure 22C:
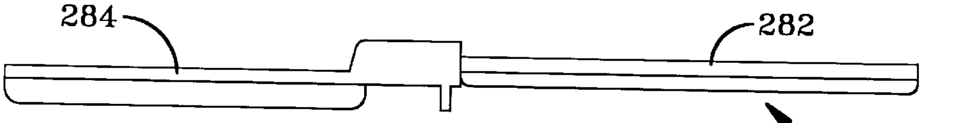
Figure 22D:
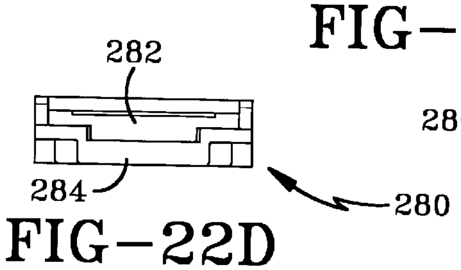
Figure 22E:
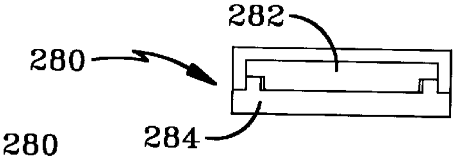
Figure 23A:
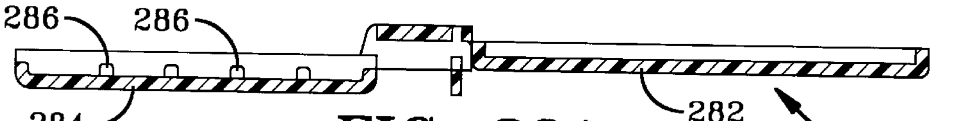
FIGS. 23A–B depicts additional views of the seventh embodiment.
Figure 23B:
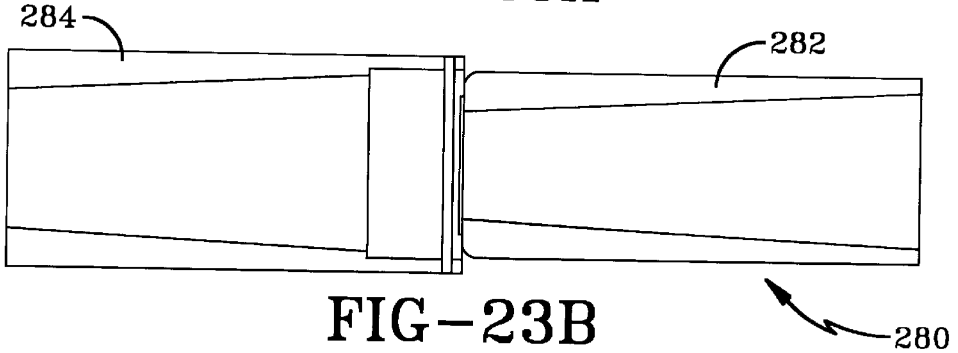
Figure 24:
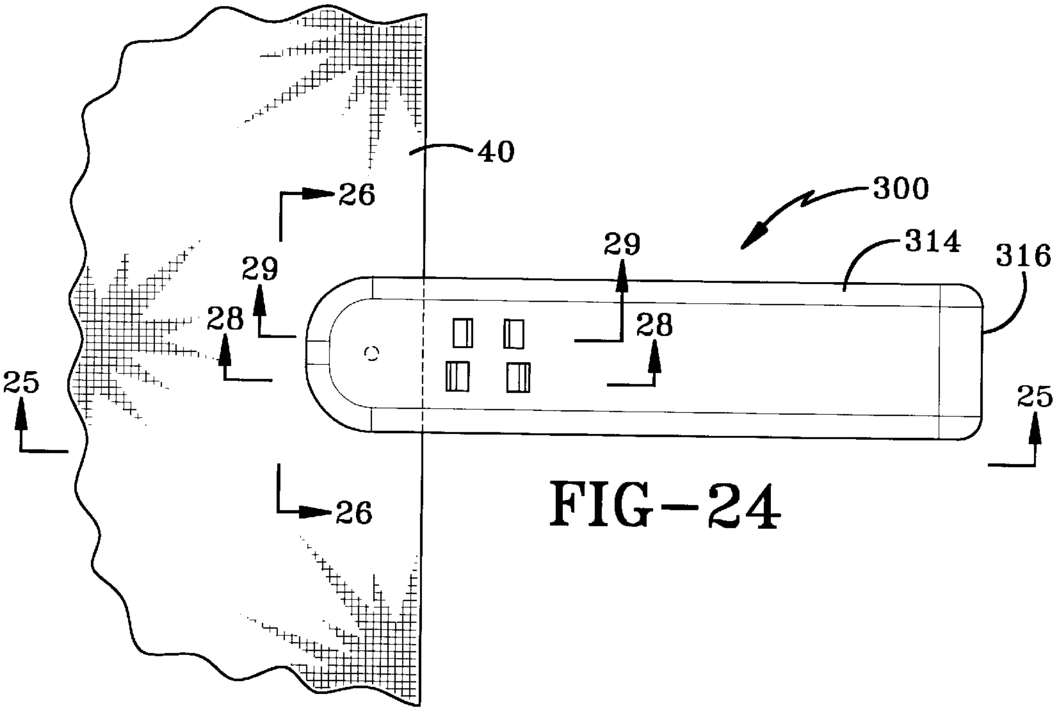
FIG. 24 is a top plan view of an eighth embodiment of the EAS tag holder of the present invention attached to a portion of an item of merchandise.
Figure 25:
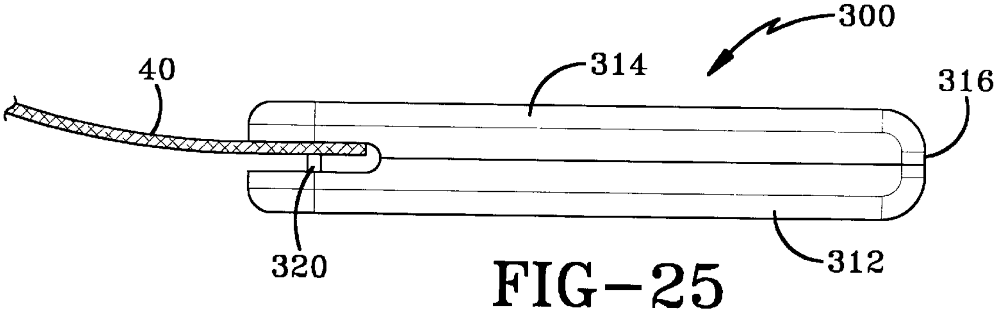
FIG. 25 is a section view taken along line 25—25 of FIG. 24.
Figure 26:
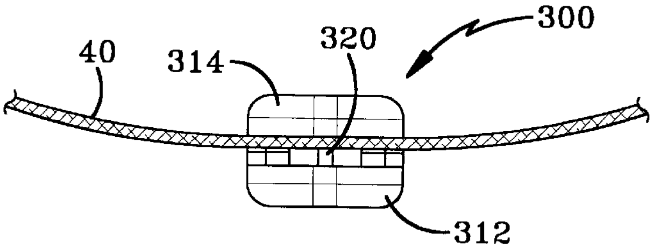
FIG. 26 is a section view taken along line 26—26 of FIG. 24.

The sixth embodiment of the EAS tag holder of the present invention is indicated generally by the numeral 250 in FIGS. 20 and 21. EAS tag holder 250 includes a base 252 and a lid 254 that are hinged together with a hinge 256. An EAS tag 258 is held between members 252 and 254. Member 254 is locked in place with a plurality of locking fingers 260.

Members 252 and 254 further hold one end of a flexible member 262 that is connected to articles of clothing in a conventional manner. Typically flexible member 262 includes a T-shaped second end that is embedded within the clothing in a manner that prevents it from being pulled out of the clothing. The structure of flexible member 262 is well known in the art and tools for inserting the T-shaped end of member 262 into clothing are also known in the art.

FIGS. 22A–23B depict different views of the seventh embodiment of the invention wherein the holder is indicated generally by the numeral 280. Holder 280 includes first 282 and second 284 members that slide relative to one another between unlocked and locked positions. Members 282 and 284 to define a compartment that holds an EAS tag. Members lock onto substrate 40 by placing a section of substrate 40 over member 284 and sliding member 282 over substrate 40 so that substrate 40 is wedged between members 282 and 284. Member 284 may include ribs 286 that help hold substrate 40 in place. A locking mechanism—such as a locking finger—may be provided between members 282 and 284 to prevent them from being slid back to the unlocked position after they are clamped in place. The locking mechanism is positioned at one of the ends of holder 280 so that the locking mechanism may be destroyed to allow members 282 and 284 to be opened.

The eighth embodiment of the EAS tag holder of the present invention is indicated generally by the numeral 300 in FIGS. 24–41. EAS tag holder 300 generally includes first and second members 312 and 314 connected together by a hinge 316. Hinge 316 may be a living hinge that hingedly connects members 312 and 314 between an open, unlocked position and a closed, locked position. Hinge 316 may also be a multi-component hinge.

EAS tag holder 300 functions by securely holding an EAS tag 318 between members 312 and 314 where it cannot be accessed when members 312 and 314 are in the locked position. EAS tag holder 300 includes a tooth 320 that secures EAS tag holder 300 to substrate 40 as described above. EAS tag holder 300 may thus be locked to substrate 40 in order to secure an EAS to substrate 40 such that an alarm will sound if substrate 40 is removed from a retail establishment having monitoring devices. EAS tag holder 300 is designed to be removed by the store clerk at the retail establishment before the retail customer leaves the retail establishment. EAS tag holder 300 may be removed with an opener 342 (FIG. 30) that allows EAS tag holder 300 to be reused or an opener 344 (FIG. 37) that breaks EAS tag holder 300. When opener 344 is used, EAS tag holder 300 is discarded after it is removed from substrate 40.

Members 312 and 314 are locked together with a locking mechanism 322 that generally includes a pair of first locking fingers 324 and a pair of second locking fingers 326 connected to each members 312 and 314. Locking fingers 324 are configured to lock with fingers 326 when members 312 and 314 are moved from the open to the closed position to close EAS tag holder 300 over item of merchandise 40. Each locking finger 324 and 326 includes a locking surface 328 that prevents fingers 324 and 326 from separating from one another once they are in the locked position depicted in FIGS. 28 and 29. Each locking surface 328 is substantially perpendicular to the longitudinal centerline of key opening 332. Each surface 328 is also substantially perpendicular to the direction that members 312 and 314 initially move when holder 300 is opened.

Each first locking finger 324 includes a first angled portion that projects outwardly away from member 312 or 314. Each first locking finger 324 also includes a second portion that projects downwardly back towards member 312 or 314 to form a V-shaped locking finger that includes an angled surface 330 that is aligned with a key opening 332 that allows a key pin 334 to enter holder 300 and engage first locking fingers 324.

Figure 27:
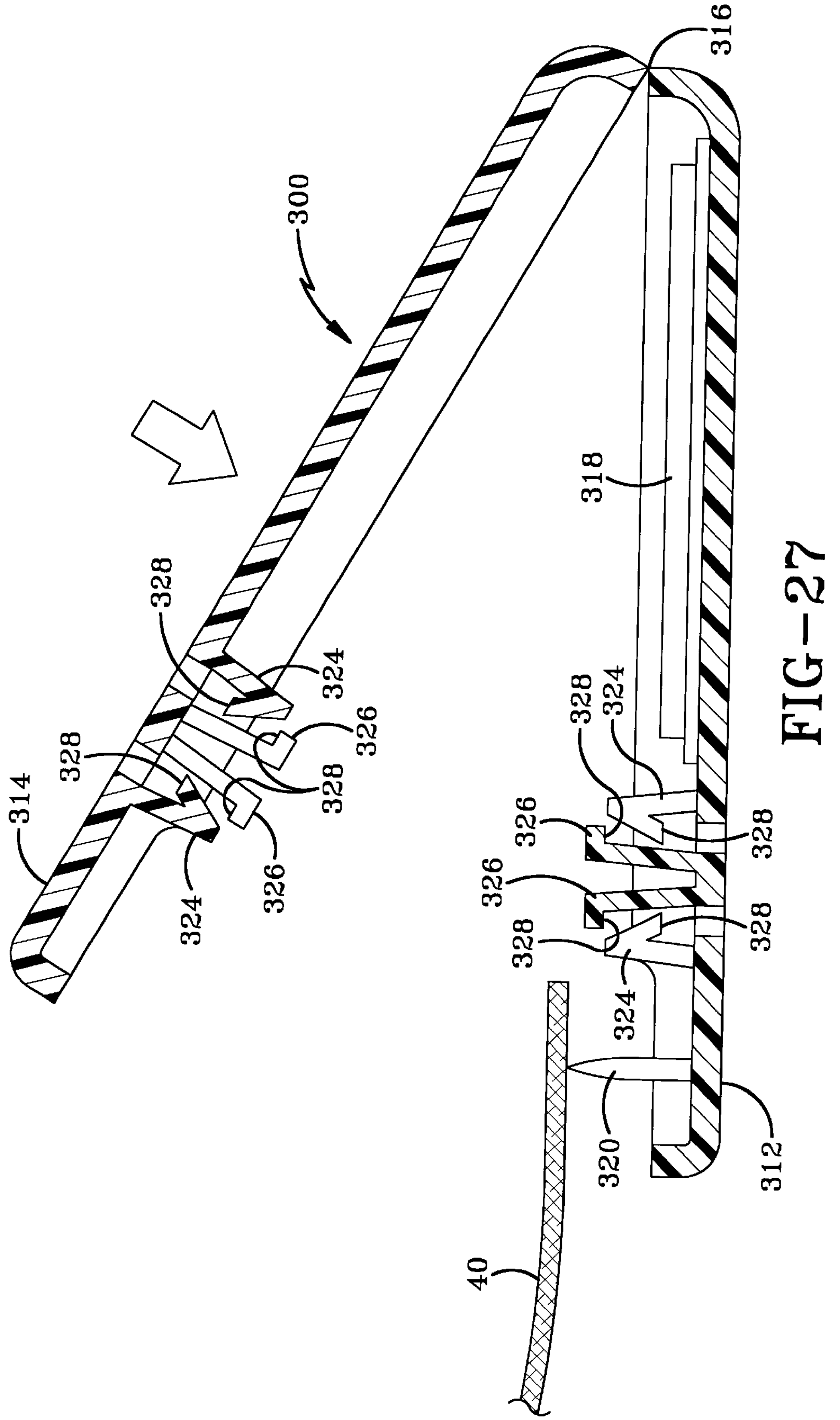
FIG. 27 is a section view taken longitudinally through the eighth embodiment of the EAS tag holder showing the holder being attached to an item of merchandise.
Figure 28:
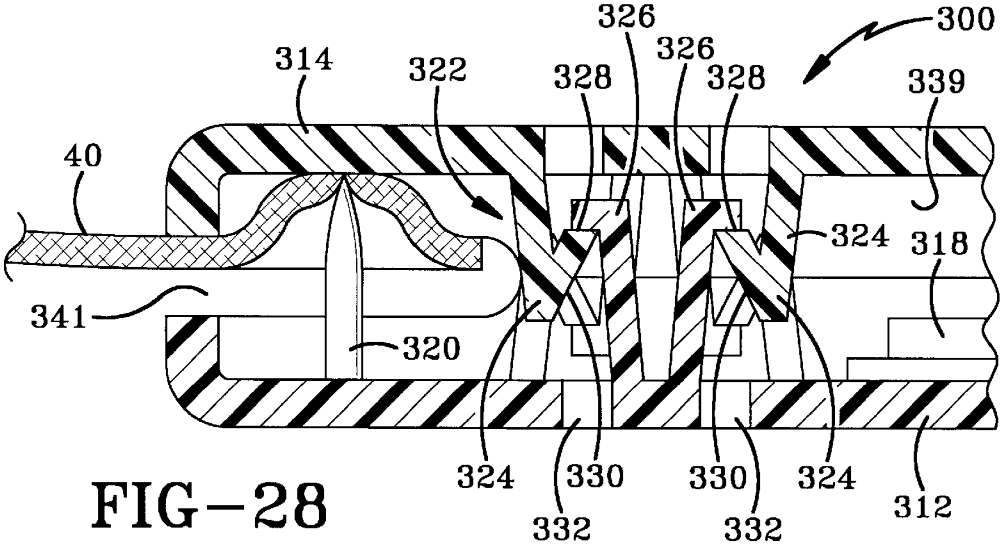
FIG. 28 is a section view taken along line 28—28 of FIG. 24.
Figure 29:
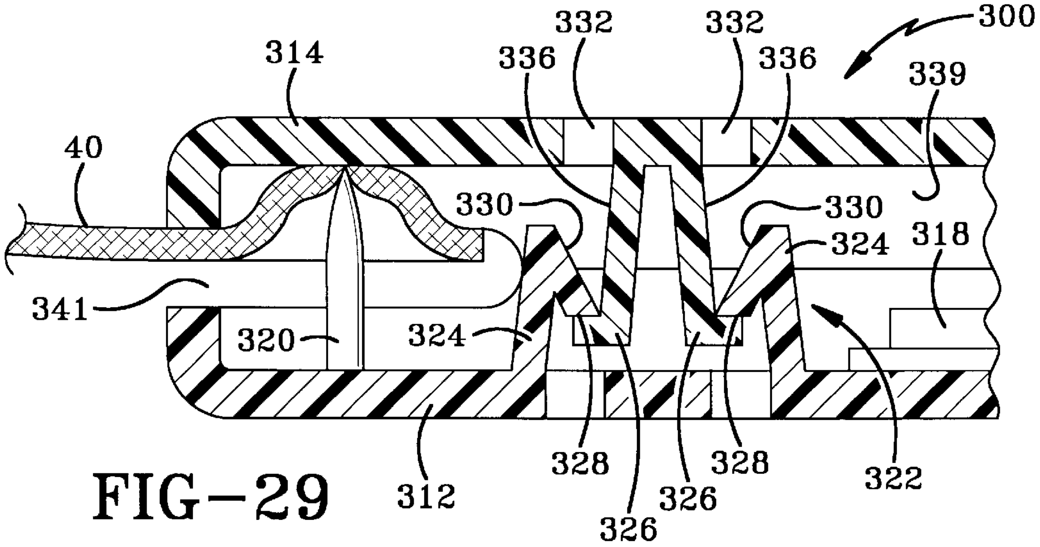
FIG. 29 is a section view taken along line 29—29 of FIG. 24.
Figure 35:
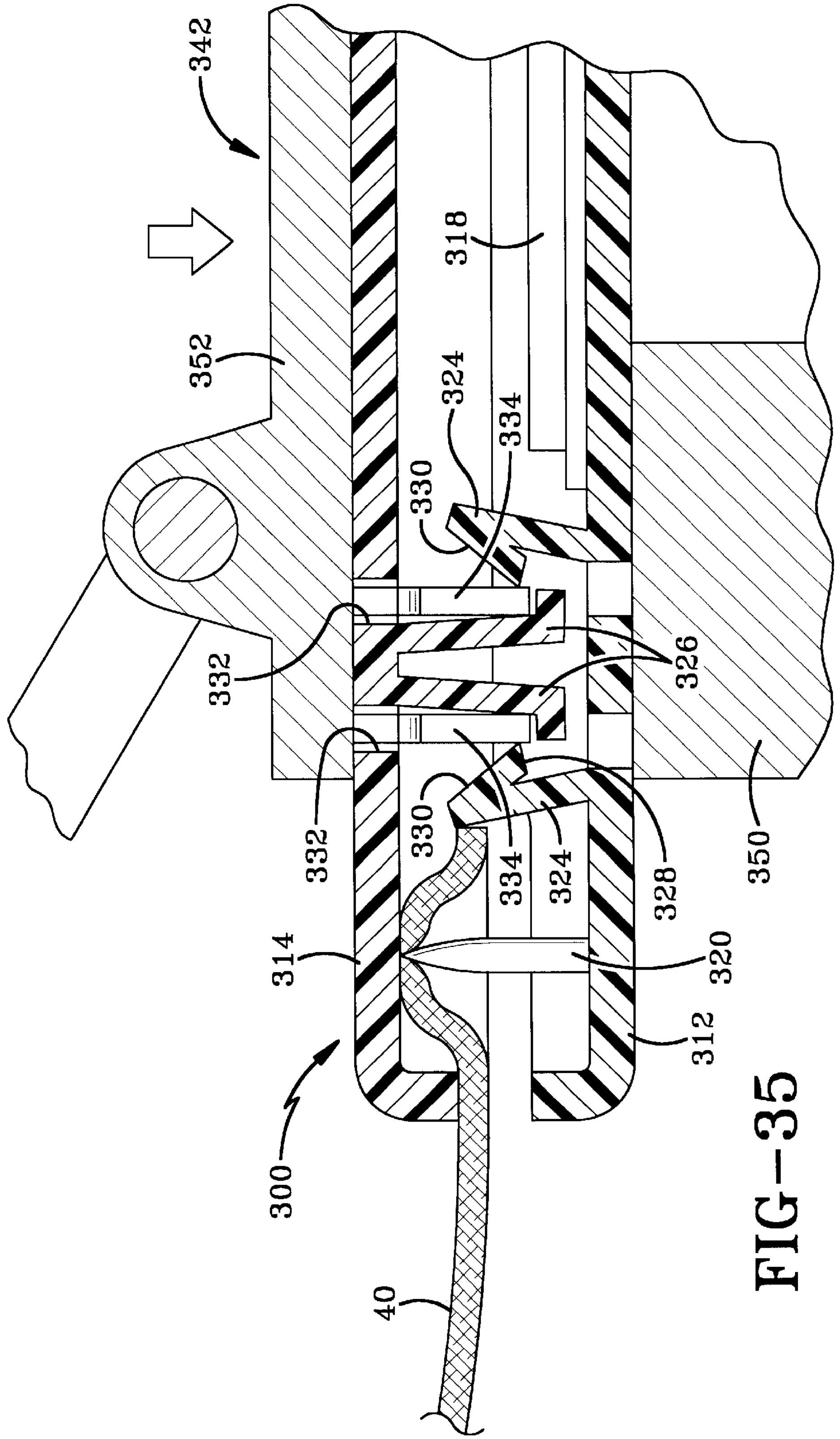
FIG. 35 is a section view taken along line 35—35 of FIG. 34.

Second locking fingers 326 also include an angled surface 336 that is aligned with openings 332. Angled surface 336 opposes angled surface 330 so that key pin 334 will be wedged between the two surfaces to force fingers 324 and 326 away from each other as depicted in FIG. 35. As best seen in FIGS. 27–29, holder 300 includes two pairs of first and second locking fingers 324, 326 disposed on opposite members 312 and 314 so that holder 300 includes a total of eight locking fingers.

First and second members 312 and 314 have cup-shaped portions that cooperate to form a compartment 339 sized to hold a variety of different types of EAS tags 318. Compartment 339 may be elongated or in the shape of a broad, flat square to hold a RF-type EAS tag. Compartment 339 is substantially inaccessible from the exterior of holder 300 so that a shoplifter cannot tamper with EAS tag 318.

First and second members 312 and 314 define a slot 341 that accepts item of merchandise or substrate 40 so that tooth 320 may engage and lock substrate 40 to holder 300 as described above with respect to the first and second embodiments of the invention. Members 312 and 314 may be integrally molded with fingers 324 and 326 to decrease the cost of manufacturing holder 300.

Figure 33:
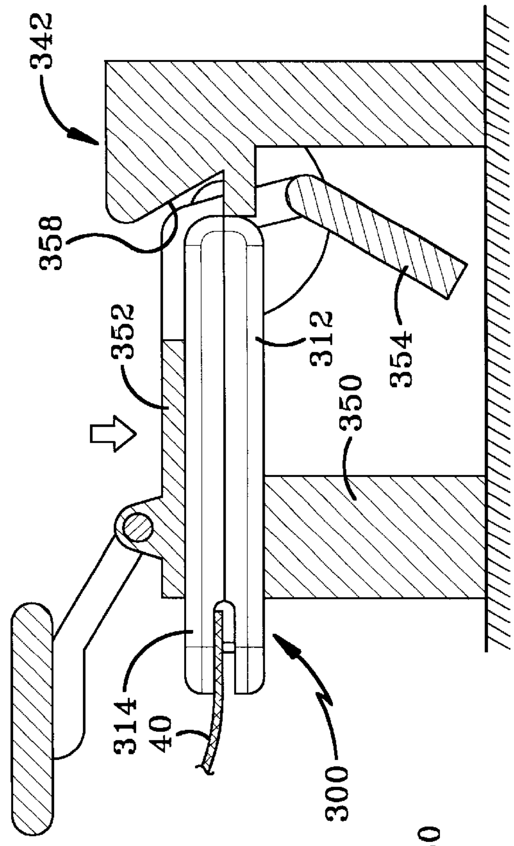
FIG. 33 is a view similar to FIG. 30 showing the opener unlocking the EAS tag holder.
Figure 30:
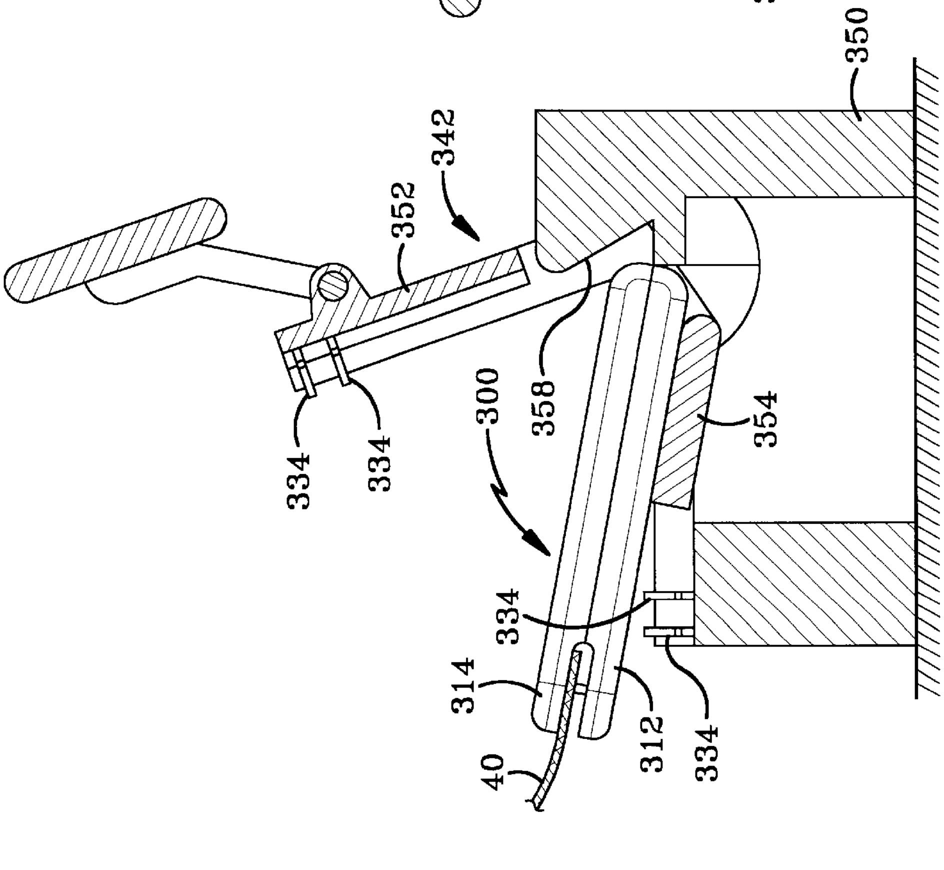
FIG. 30 is a section view of the eighth embodiment of the EAS tag holder being placed in one embodiment of an opener.
Figure 31:
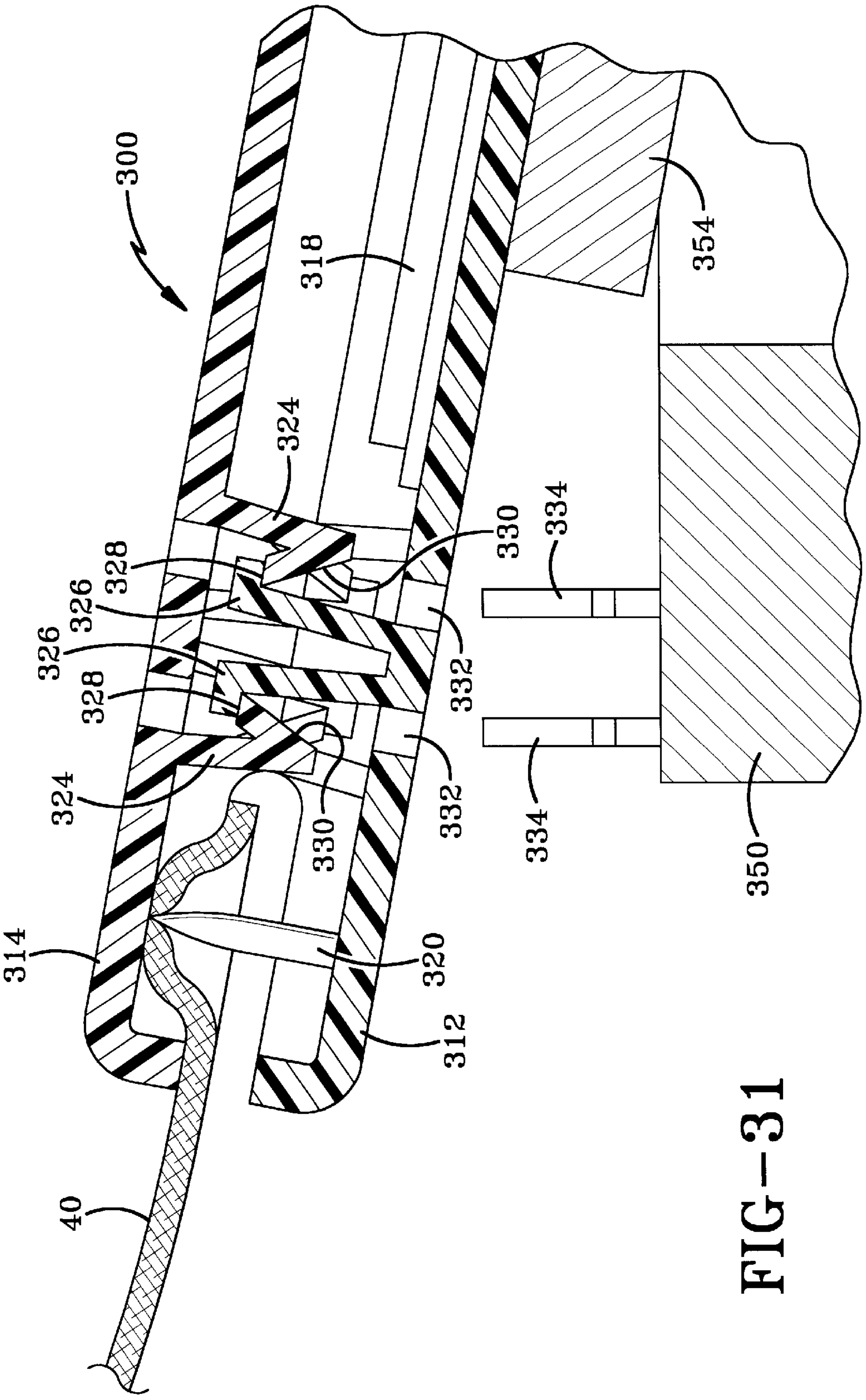
FIG. 31 is an enlarged section view of the locking fingers of the eighth embodiment being aligned with the key pins.
Figure 32:
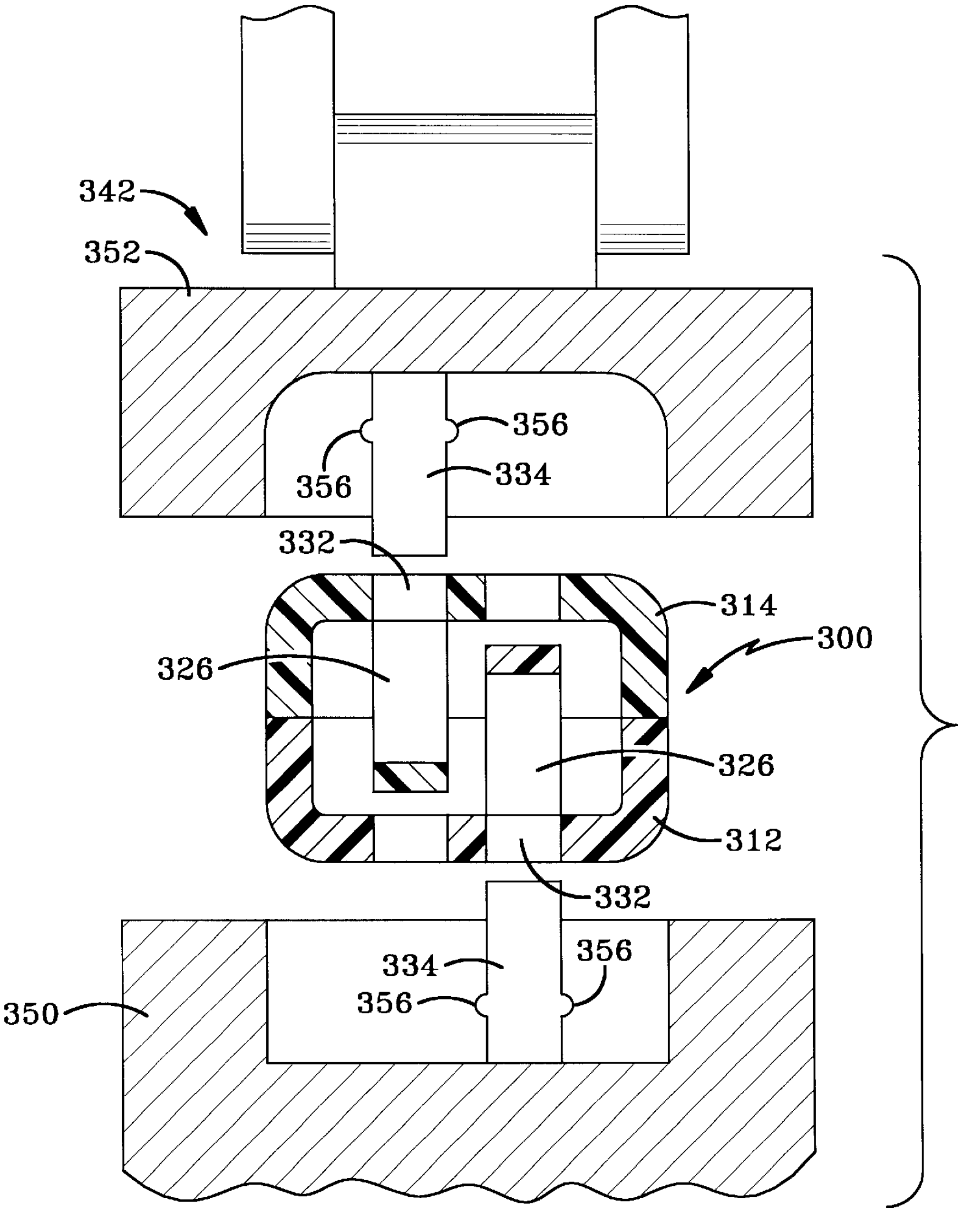
FIG. 32 is an end view of the locking fingers aligned with the key pins.
Figure 34:
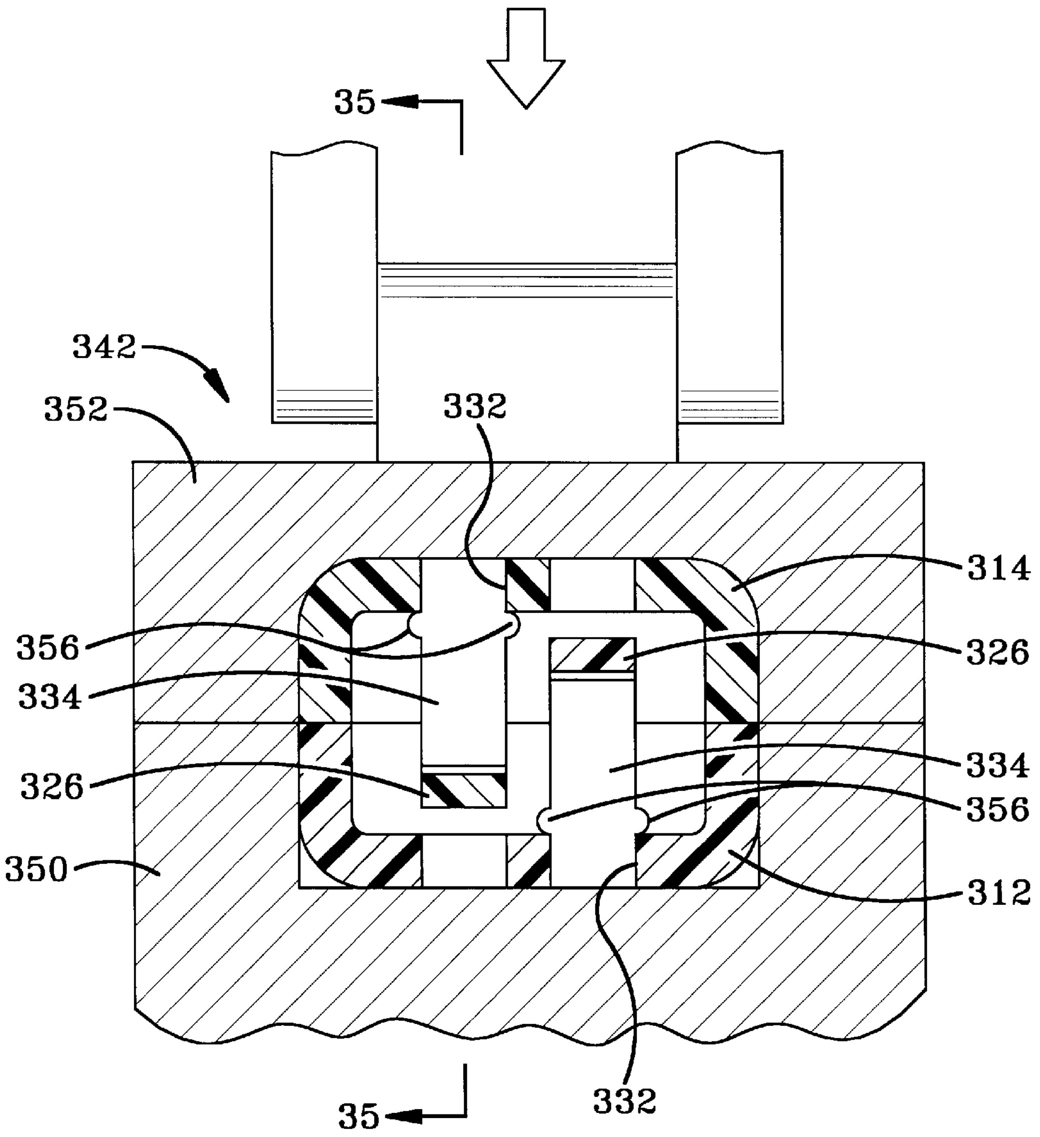
FIG. 34 is an end view similar to FIG. 32 showing the key pins interacting with the locking fingers to move the fingers to the unlocked position.

EAS tag holder 300 may be opened by inserting key pins 334 into openings 332 to unlock fingers 324 and 326 so that members 312 and 314 may be pivoted away from each other. One type of opener 342 is depicted in FIGS. 30–36. Opener 342 includes a base 350 and a pivoting member 352. A pair of key pins 334 project upwardly from base 350 and a pair of key pins 334 project downwardly from pivoting member 352. Opener 342 functions by placing holder 300 in a cradle 354 that moves with pivoting member 352. Pivoting member 352 is then pivoted downwardly towards base 350 until holder 300 is pushed down onto key pins 334 of base 350. Key pins 334 attached to pivoting member 352 are then pushed down through the top of holder 300 and cradle 354 moves downwardly out of contact with holder 300. This position is depicted in FIG. 33.

Figure 36:
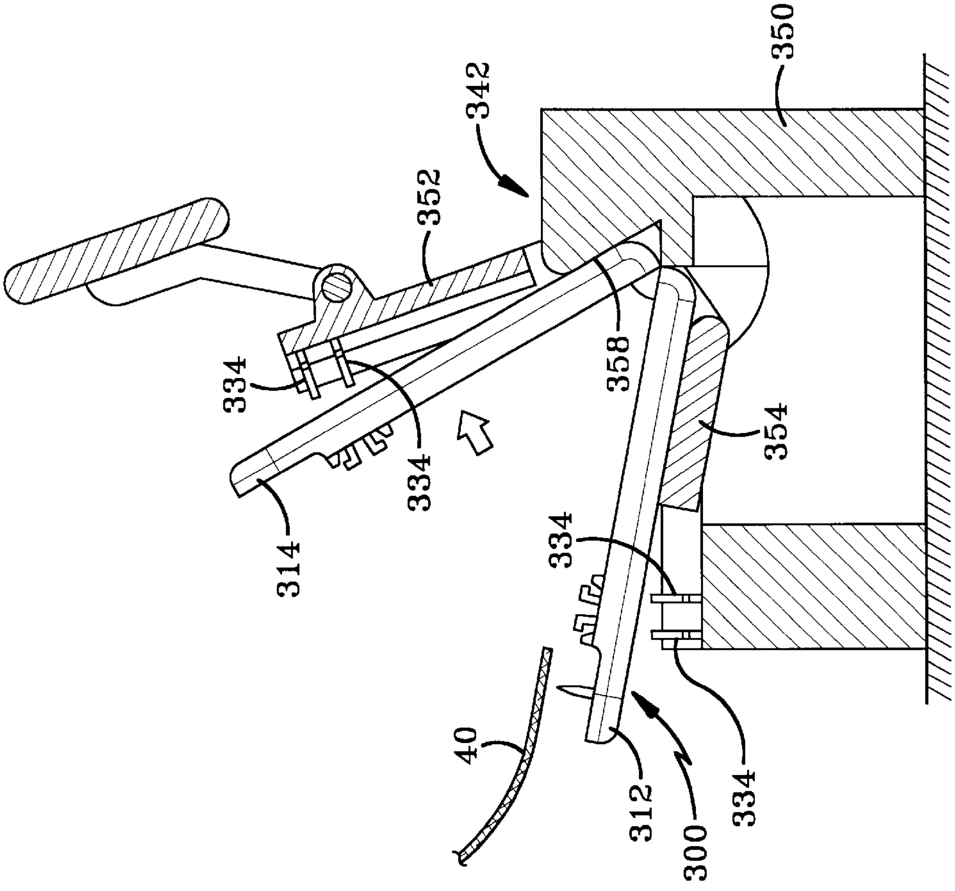
FIG. 36 is a view similar to FIG. 30 showing the eighth embodiment of the EAS tag holder in an open position with the item of merchandise being removed.

Each key pin 334 includes projections 356 that snap into holder 300 to allow holder 300 to be opened by opener 342. Once holder 300 is in the unlocked but closed position depicted in FIG. 33, the user lifts pivoting member 352 as depicted in FIG. 36 so that member 314 is pulled upwardly away from member 312 to open holder 300. Member 314 continues to pivot away from member 312 until cradle 354 engages member 312 to lift it off of key pins 334 of base 350. At approximately the same time, member 314 engages stop 358 to hold it in position while pins 334 of pivoting member 352 are pulled out of member 314 to disengage holder 300 from opener 342. Substrate 40 may then be removed from holder 300 and holder 300 may be discarded or reused if desired.

The second embodiment of the opener used with holder 300 is depicted in FIGS. 37–41. Opener 344 functions by breaking locking fingers 324 and 326 so that members 312 and 314 may be opened as described above. Once fingers 324 and 326 are broken, holder 300 must be discarded.

Figure 39:
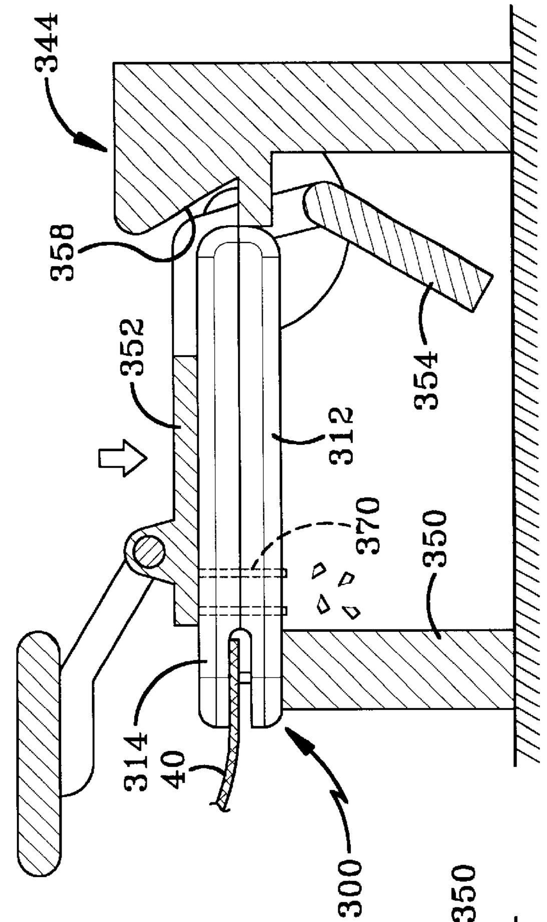
FIG. 39 is a view similar to FIG. 37 showing the opener breaking the locking fingers of the EAS tag holder.
Figure 37:
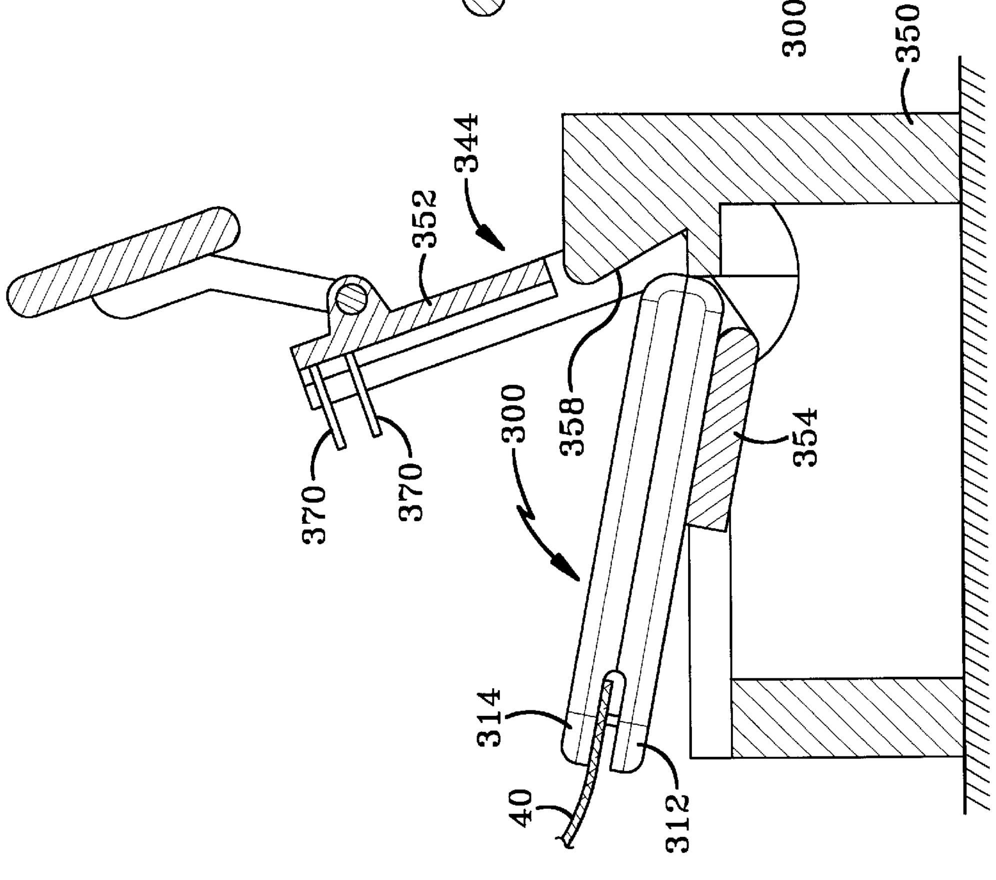
FIG. 37 is a view similar to FIG. 30 showing a second embodiment of the opener.
Figure 38:
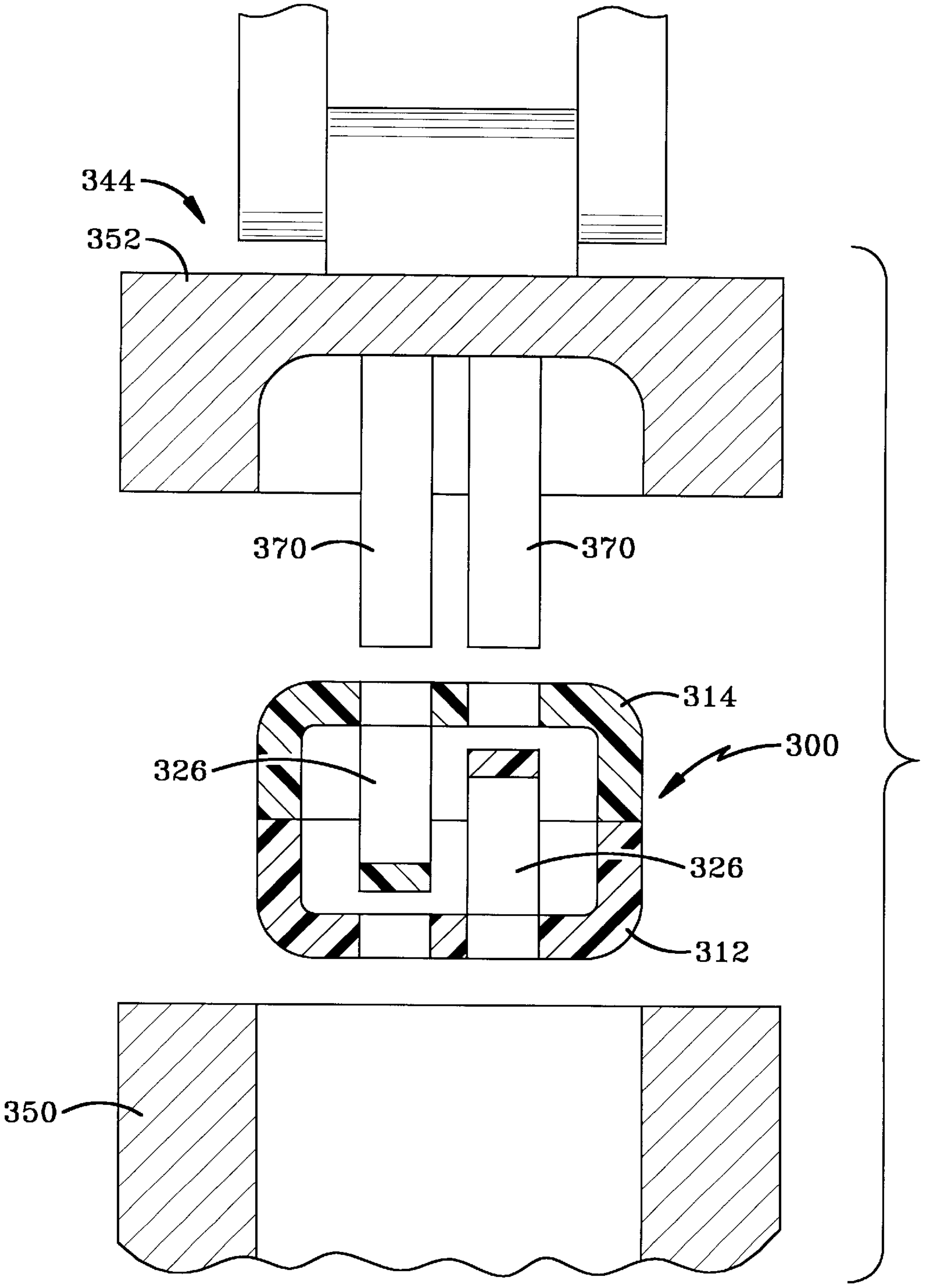
FIG. 38 is an exploded end view showing the locking fingers of the eighth embodiment of the disposable EAS tag aligned with the key pins of the opener.
Figure 40:
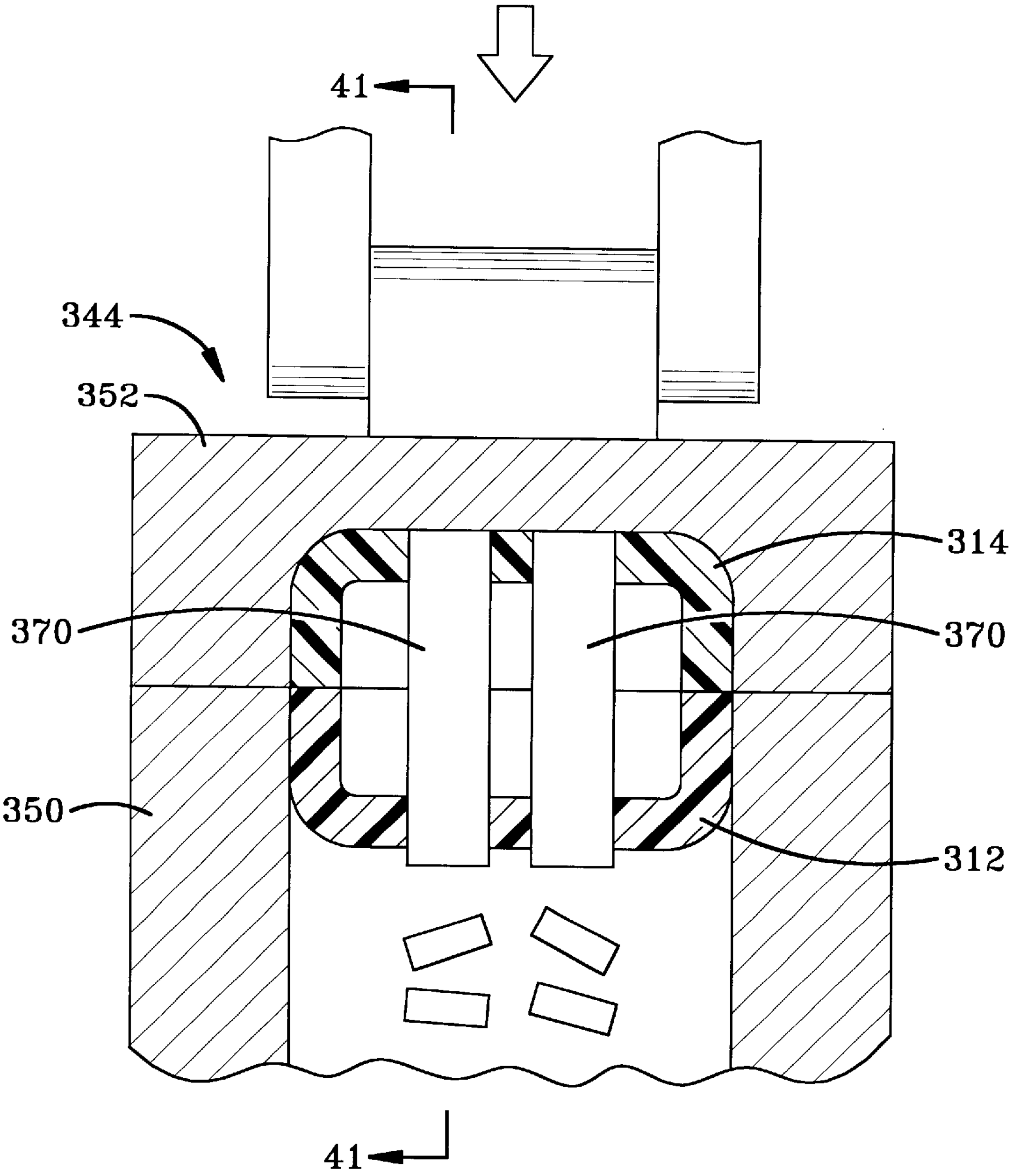
FIG. 40 is a view similar to FIG. 38 showing the opener breaking the locking fingers of the EAS tag holder.
Figure 41:
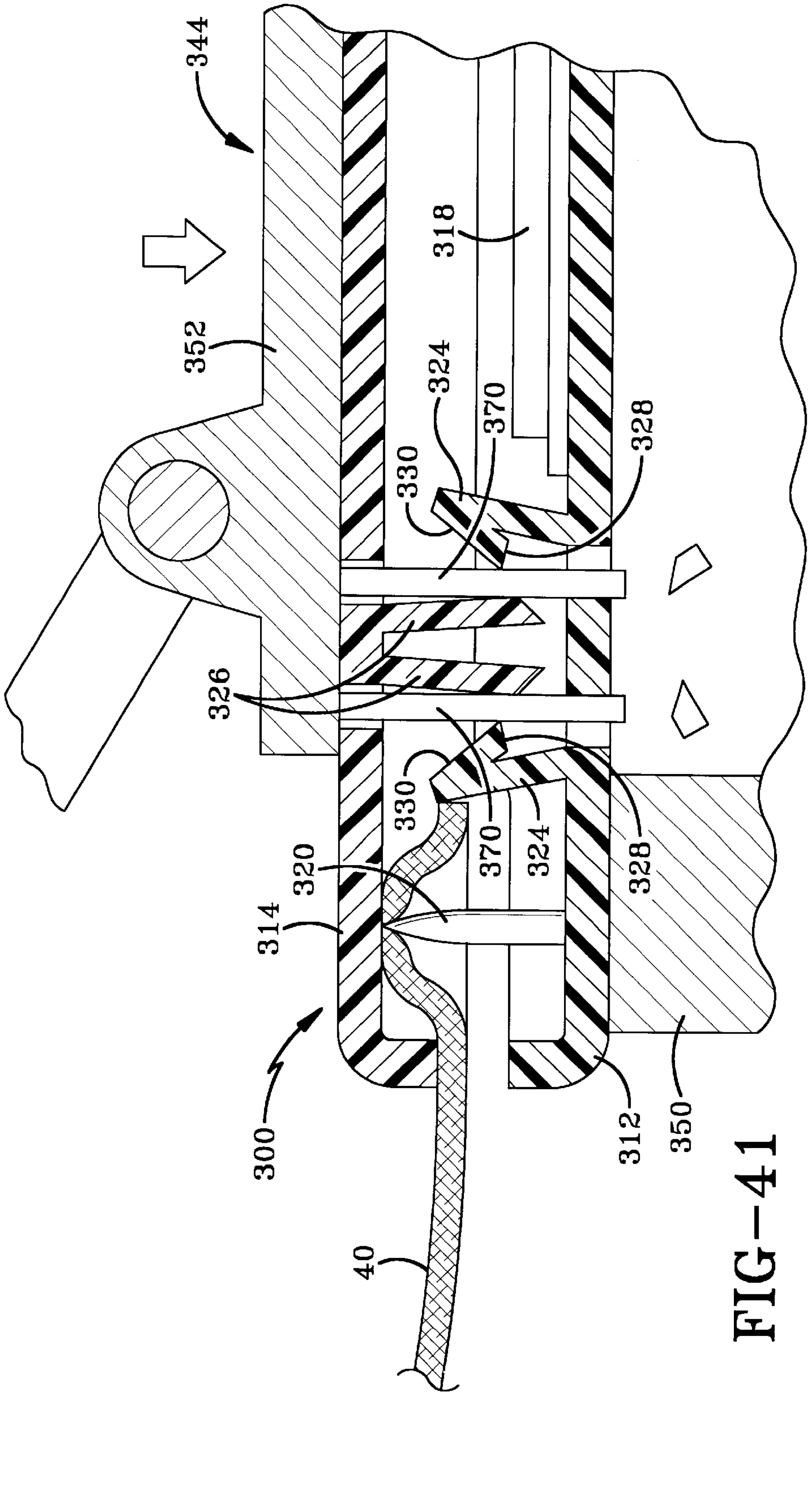
FIG. 41 is a section view taken along line 41—41 of FIG. 40.
Figure 42:
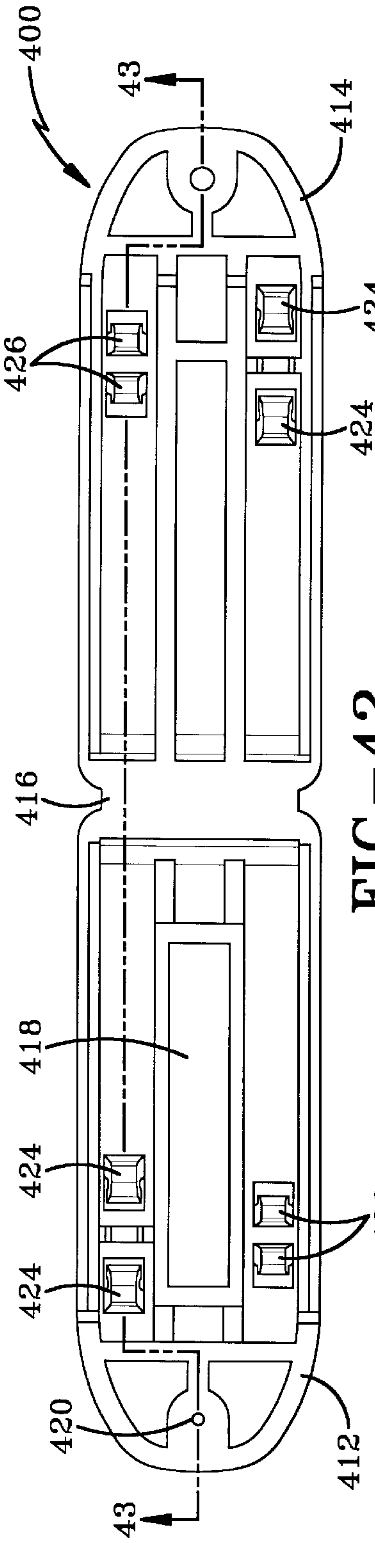
FIG. 42 is a plan view of the inside of the ninth embodiment of the EAS tag holder in an open condition.
Figure 43:
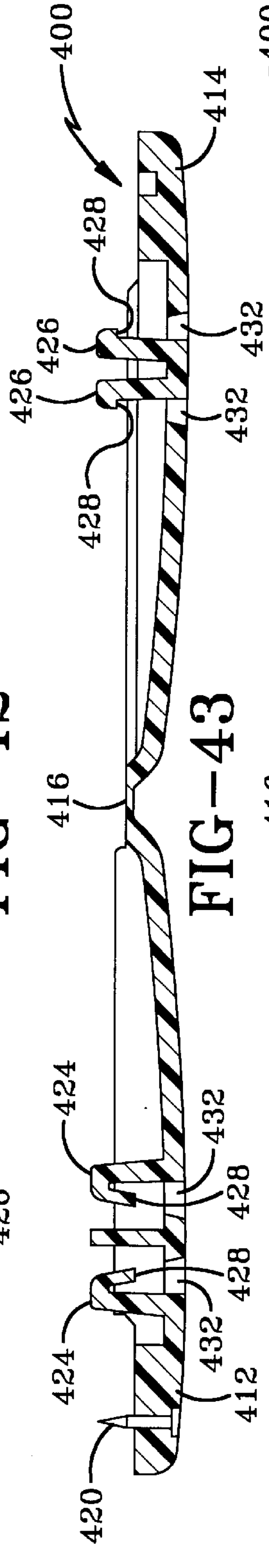
FIG. 43 is a section view taken along line 43—43 of FIG. 42.
Figure 44:
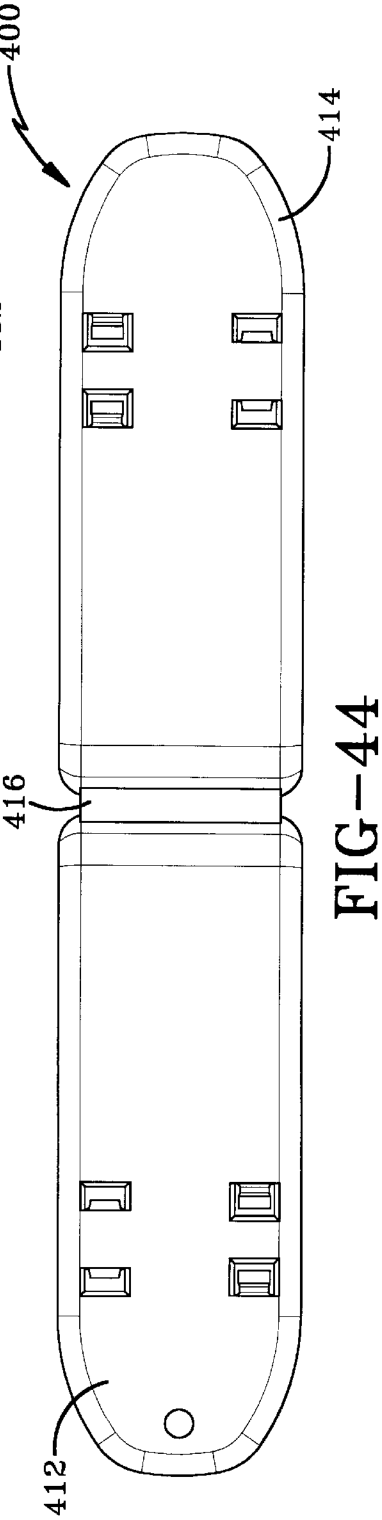
FIG. 44 is a plan view of the outside of the ninth embodiment of the invention.
Figure 45:
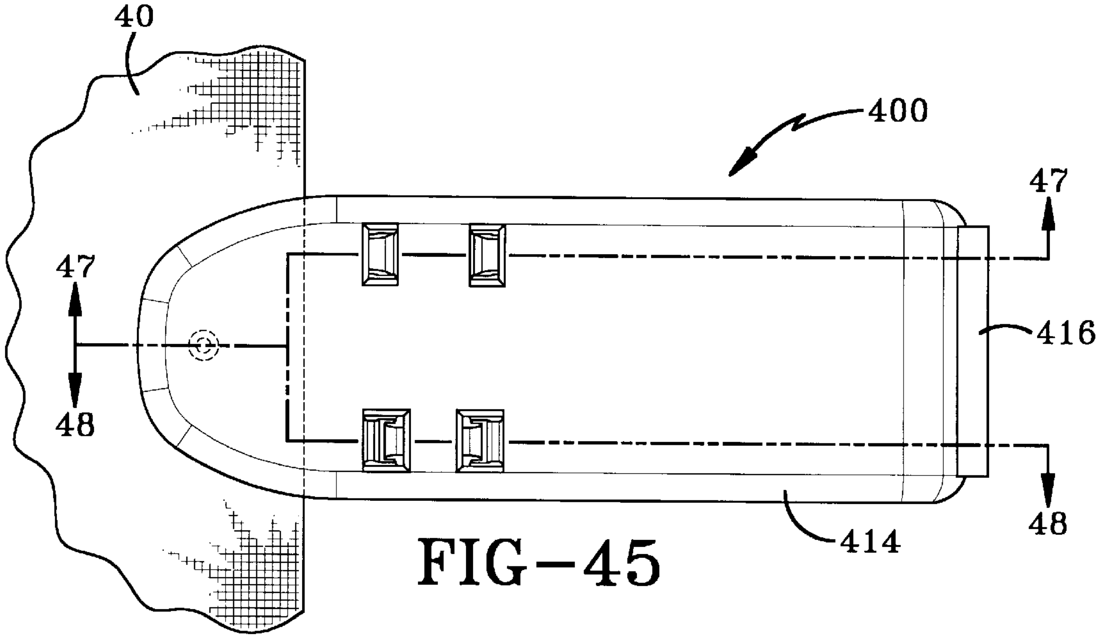
FIG. 45 is a plan view of the ninth embodiment of the EAS tag holder locked to a substrate.
Figure 46:
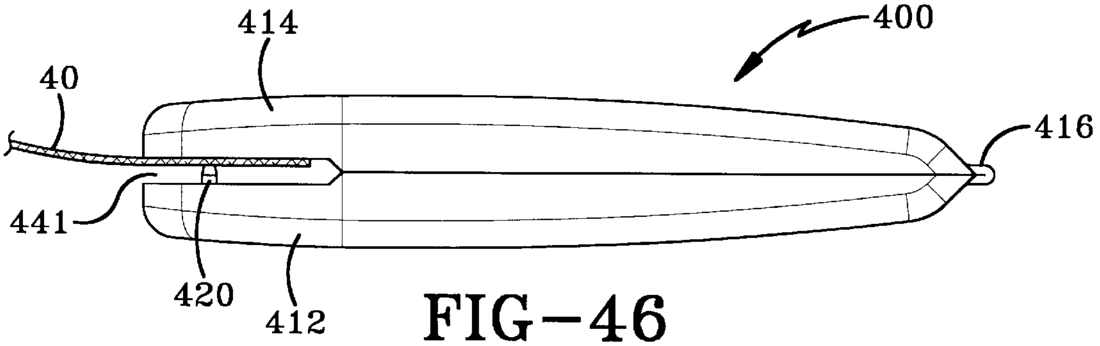
FIG. 46 is a side view of FIG. 45.
Figure 47:
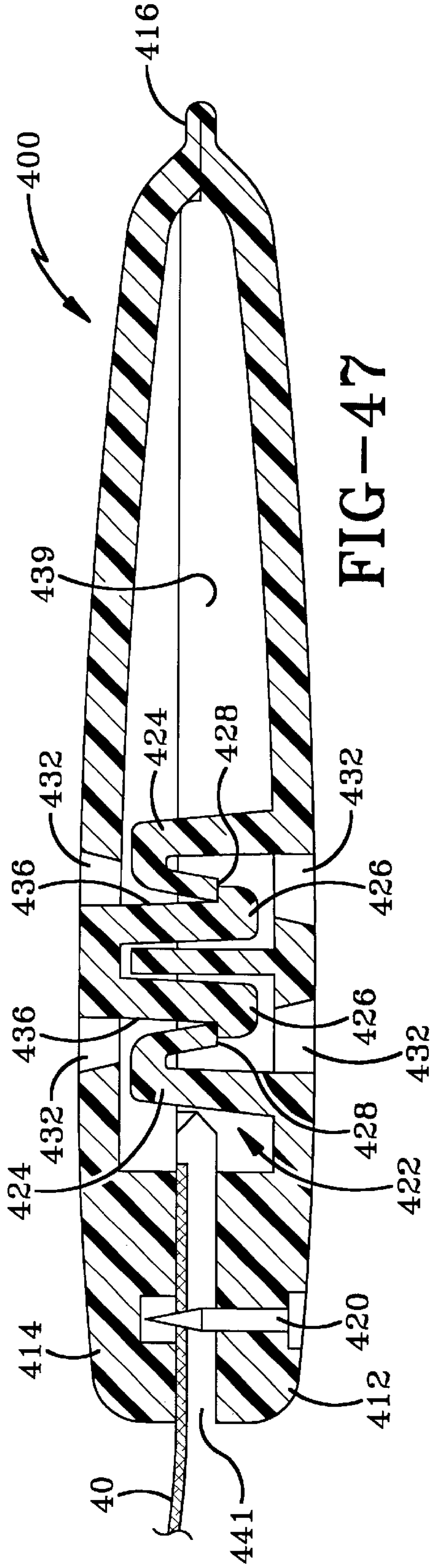
FIG. 47 is a section view taken along line 47—47 of FIG. 45.
Figure 48:
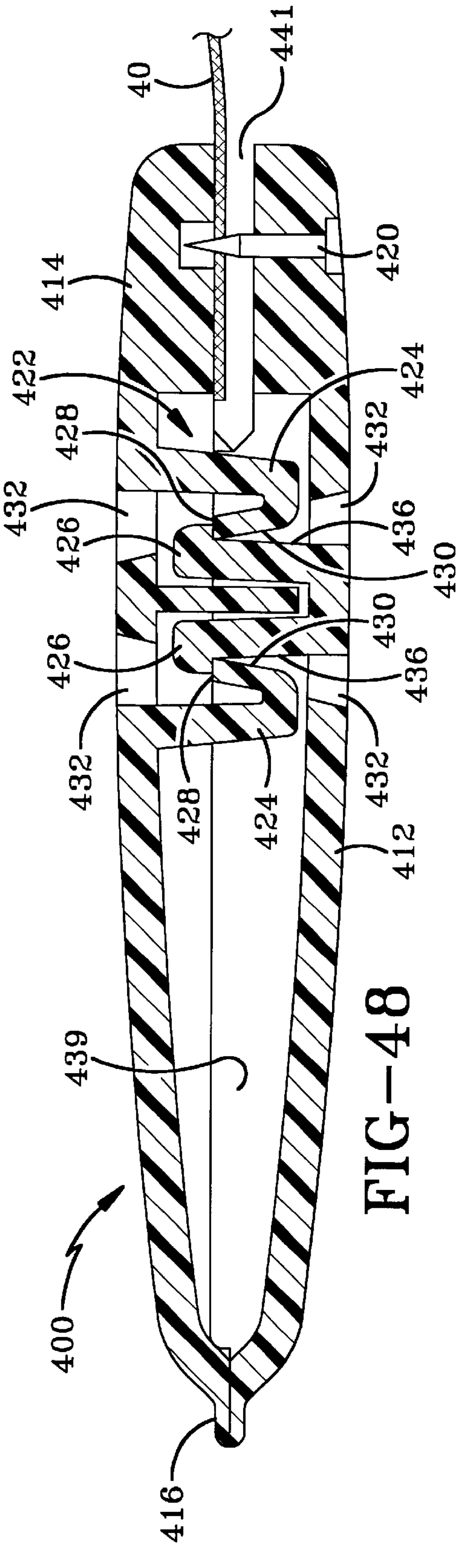
FIG. 48 is a section view taken along line 48—48 of FIG. 45.

Opener 344 may include the same elements as opener 342 described above. One change is that key pins 334 projecting from base 350 are removed and the key pins projecting down from pivoting member 352 are longer than the thickness of holder 300 as depicted in FIGS. 39, 40, and 41. The long key pins are referred to by numeral 370. Key pins 370 project down from pivoting member 352. Key pins 370 are designed to engage fingers 324 and 326 and break portions of fingers 324 and 326 so that members 312 and 314 are no longer locked together by fingers 324 and 326. The debris from the broken fingers may be held within members 312 and 314 or may be pushed out of key openings 332 as depicted in FIGS. 39 and 40.

The ninth embodiment of the EAS tag holder of the present invention is indicated generally by the numeral 400 in FIGS. 42–54. EAS tag holder 400 generally includes first and second members 412 and 414 connected together by a hinge 416. Hinge 416 may be a living hinge that hingedly connects members 412 and 414 between an open, unlocked position and a closed, locked position. Hinge 416 may also be a multi-component hinge.

EAS tag holder 400 functions by securely holding an EAS tag 418 between members 412 and 414 where it cannot be accessed when members 412 and 414 are in the locked position. EAS tag holder 400 includes a tooth 420 that secures EAS tag holder 400 to substrate 40 as described above. EAS tag holder 400 may thus be locked to substrate 40 in order to secure an EAS to substrate 40 such that an alarm will sound if substrate 40 is removed from a retail establishment having monitoring devices. EAS tag holder 400 is designed to be removed by the store clerk at the retail establishment before the retail customer leaves the retail establishment. EAS tag holder 400 may be removed with an opener similar to opener 342 (FIG. 30) that allows EAS tag holder 400 to be reused or an opener 344 (FIG. 37) that breaks EAS tag holder 400. When opener 344 is used, EAS tag holder 400 is discarded after it is removed from substrate 40.

Members 412 and 414 are locked together with a locking mechanism 422 that generally includes two sets of first 424 and second 426 locking finger pairs. Each member 412 and 414 supports a pair of first locking fingers 424 and a pair of second locking fingers 426. Locking fingers 424 on member 412 are configured to lock with fingers 426 on member 414 when members 412 and 414 are moved from the open position to the closed position to close EAS tag holder 400 over item of merchandise 40. Simultaneously, locking fingers 424 on member 414 are configured to lock with fingers 426 on member 412. Each locking finger 424 and 426 includes a locking surface 428 that prevents fingers 424 and 426 from separating from one another once they are in the locked position depicted in FIGS. 47 and 48. Each locking surface 428 is substantially perpendicular to the longitudinal centerline of key opening 432. Each surface 428 is also substantially perpendicular to the direction that members 412 and 414 initially move when holder 400 is opened.

Each first locking finger 424 includes a first angled portion that projects outwardly away from member 412 or 414. Each first locking finger 424 also includes a second portion that projects downwardly back towards member 412 or 414 to form a V-shaped locking finger that includes an angled surface 430 that is aligned with a key opening 432 that allows a key pin to enter holder 400 and engage first locking fingers 424.

Second locking fingers 426 also include an angled surface 436 that is aligned with openings 432. Angled surface 436 opposes angled surface 430 so that the key pin will be wedged between the two surfaces to force fingers 424 and 426 away from each other.

On each member 412 and 414, fingers 424 and 426 are disposed on opposite sides of the compartment that holds EAS tag 418. EAS tag 418 is thus positioned between the locked fingers 424 and 426 and the overall length of holder 400 may be designed to be larger than the length of EAS tag 418 by the length of hinge 416 and the length of the jaws of holder 400.

First and second members 412 and 414 have portions that cooperate to form a compartment 439 sized to hold a variety of different types of EAS tags 418. Compartment 439 may be elongated or in the shape of a broad, flat square to hold a RF-type EAS tag. Compartment 439 is substantially inaccessible from the exterior of holder 400 so that a shoplifter cannot tamper with EAS tag 418.

The jaws of first and second members 412 and 414 define a slot 441 that accepts item of merchandise or substrate 40 so that tooth 420 may engage and lock substrate 40 to holder 400 as described above with respect to the first and second embodiments of the invention. Members 412 and 414 may be integrally molded with fingers 424 and 426 to decrease the cost of manufacturing holder 400.

Figure 49:
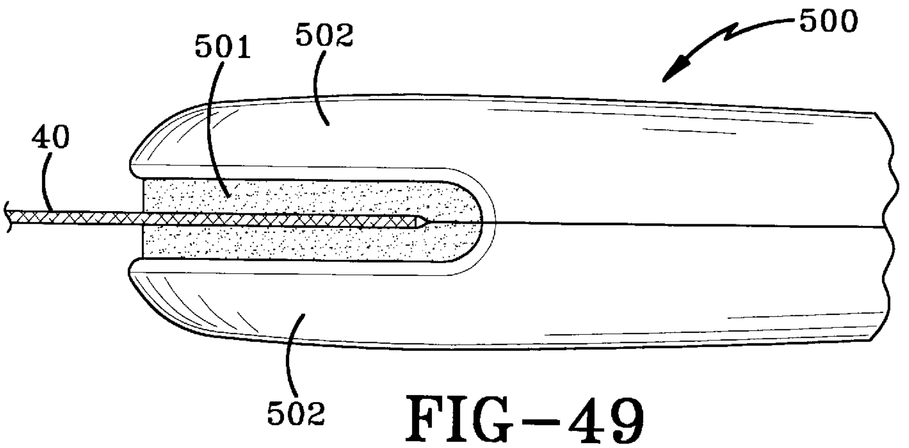
FIG. 49 is a side view of a tenth alternative embodiment of the EAS tag holder.

FIG. 49 depicts a tenth embodiment of the invention wherein a soft, compressible filler material 501 is used between the jaws 520 of the holder 500. Filler material 501 may be a foam or a cloth that protects that section of substrate 40 when holder 500 is installed. In the tenth embodiment of the invention, the tooth is used in conjunction with filler 501. Filler 501 simply clamps the section of substrate 40 adjacent the tooth so that the tooth does not tear substrate 40.

Figure 50:
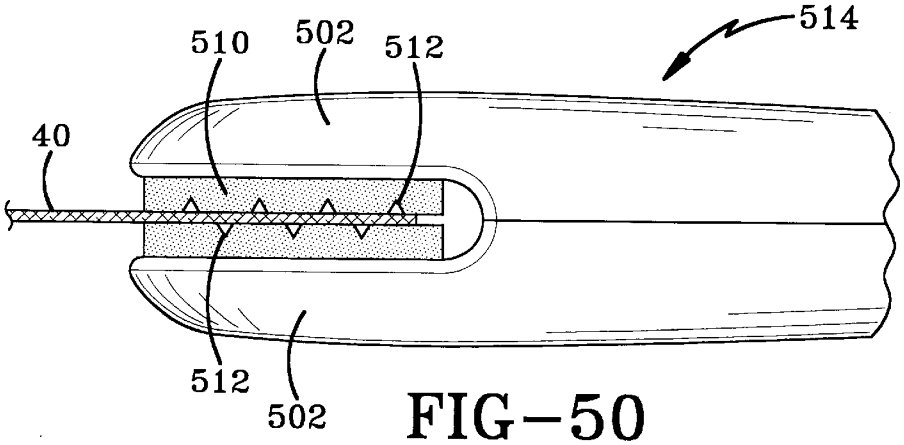
FIG. 50 is a side view of a eleventh alternative embodiment of the EAS tag holder.

In the eleventh embodiment of the invention depicted in FIG. 50, filler 510 is a hard, somewhat resilient material that clamps substrate 40 so that substrate 40 cannot be removed from jaws 502 without damaging substrate 40 or jaws 502. Filler 510 may be a hard rubber or plastic material than grips and clamps substrate 40. Numerous materials known to those skilled in the art may be used for filler 510. Filler 510 may define a series of notches 512 that define teeth edges that help filler 510 grip substrate 40. In other embodiments, a plurality of raised teeth, ribs, fingers, or small pins may extends from filler 510 to help filler 510 grip on substrate 40. In the eleventh embodiment of the invention, the holder 514 does not include the tooth that extends through substrate 40. Holder 514 is only held to substrate 40 by the frictional force between filler 510 and substrate 40.

Figure 51:
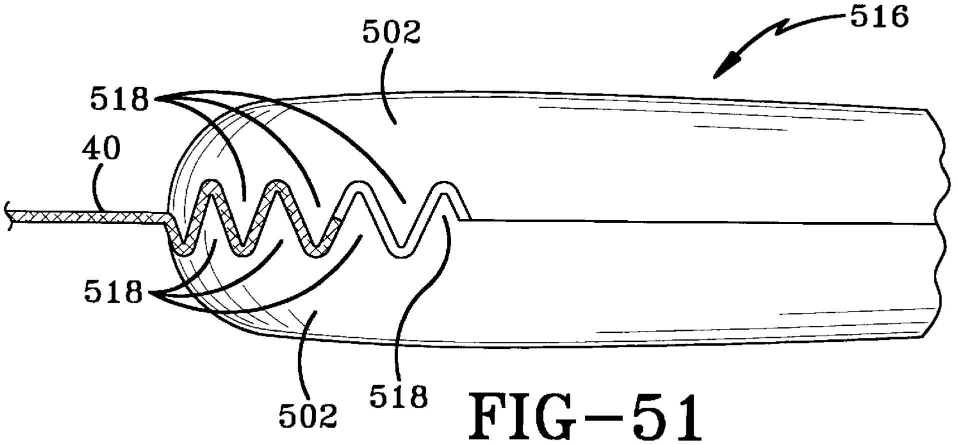
FIG. 51 is a side view of a twelve alternative embodiment of the EAS tag holder.

The twelfth embodiment of the holder is indicated by the numeral 510 in FIG. 51. In this embodiment, holder 516 lacks both the tooth and the filler. Instead, the gripping force is created by configured the opposing surfaces of jaws 502 as teeth 518 that grip substrate 40. Teeth 518 interlock to create a strong gripping force on substrate 40. Teeth 518 are fabricated from the same material as the body of holder 516. This material may be any of a variety of plastics or metals known in the art. Suitable plastics may be polycarbonate or fiber-filled polypropylene.

Figure 52:
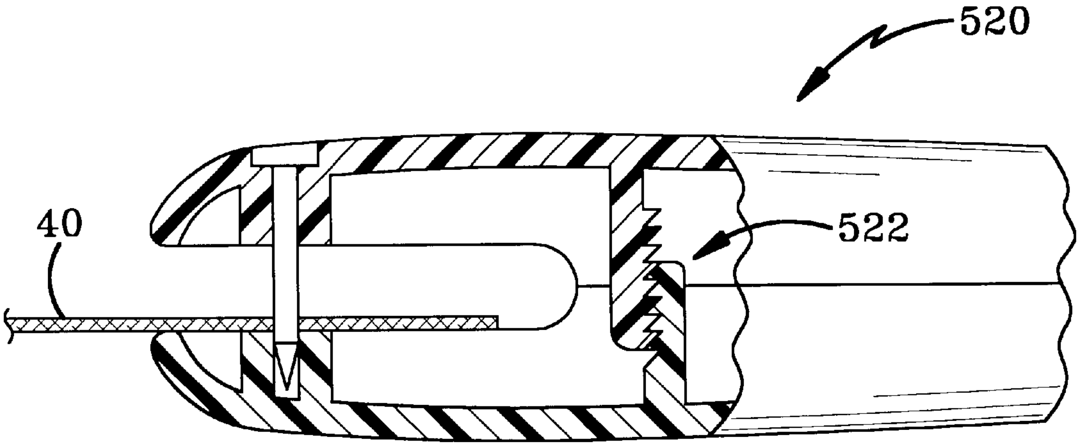
FIG. 52 is a side view, partially in section, of a thirteenth alternative embodiment of the EAS tag holder.

The thirteenth embodiment of the invention is indicated generally by the numeral 520 in FIG. 52. This embodiment of the holder includes a ratchet mechanism 522 that allows holder 520 to be used with substrates 40 having different thicknesses. Ratchet mechanism 522 includes a plurality of teeth disposed adjacent to each other to allow the different members of holder 520 to lock together in a variety of different positions. Ratchet mechanism 522 may be used in cooperation with any of the locking fingers described above including the locking fingers that may be unlocked and the locking fingers that lock until a portion of holder 520 is destroyed. Ratchet mechanism 522 may also be used in embodiments with or without the tooth that is connected to substrate 40.

Figure 53:
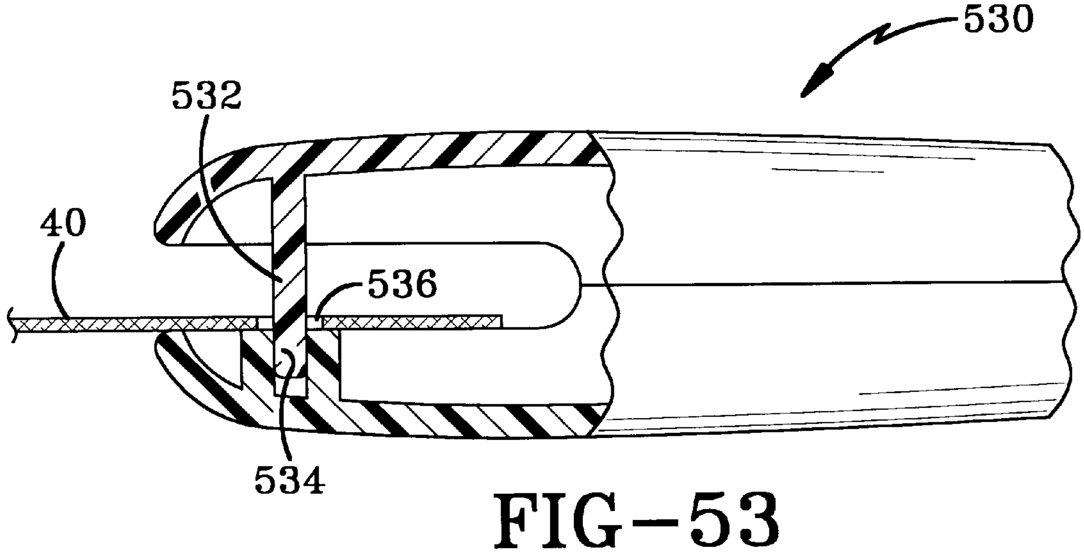
FIG. 53 is a side view, partially in section, of a fourteenth alternative embodiment of the EAS tag holder.

The fourteenth embodiment of the invention is indicated generally by the numeral 530 in FIG. 53. In this embodiment, tooth 532 has a rounded end 534 that cannot be pushed through tightly-woven substrates without tearing or stretching substrate 40. Tooth 532 may thus be used by retail establishments that wish to tag their merchandise without piercing a portion of the merchandise. In this embodiment, tooth 532 is disposed in an opening 536 that already exists in substrate 40.

The fifteenth embodiment of the EAS tag holder is indicated generally by the numeral 600 in FIGS. 54 to 64. EAS tag holder 600 generally includes first 612 and second 614 members that are connected together with a hinge 616. First 612 and second 614 are movable between the open, unlocked position of FIGS. 54–56 and the closed, locked position of FIGS. 57–59. Holder 600 may thus be attached to substrate 40 in the manner described above where the tooth 620 is used to attach holder 600 to substrate 40. Members 612 and 614 define a compartment 639 sized to receive an EAS tag 618.

Figures 54, 55, 56:
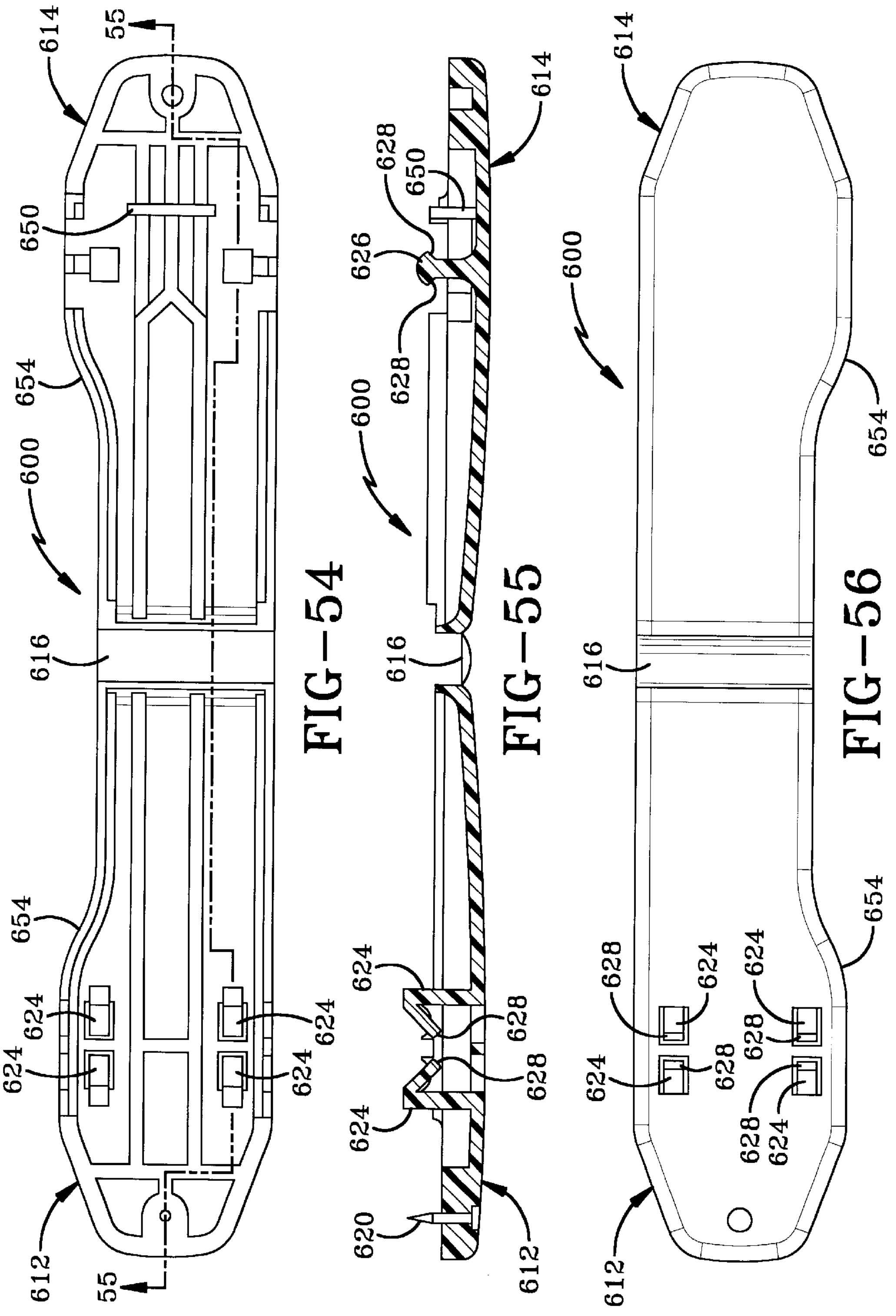
FIG. 54 is a plan view of the inside of the fifteenth embodiment of the EAS tag holder in an open condition.
FIG. 55 is a section view taken along line 43—43 of FIG. 42.
FIG. 56 is a plan view of the outside of the fifteenth embodiment of the invention.
Figure 57:
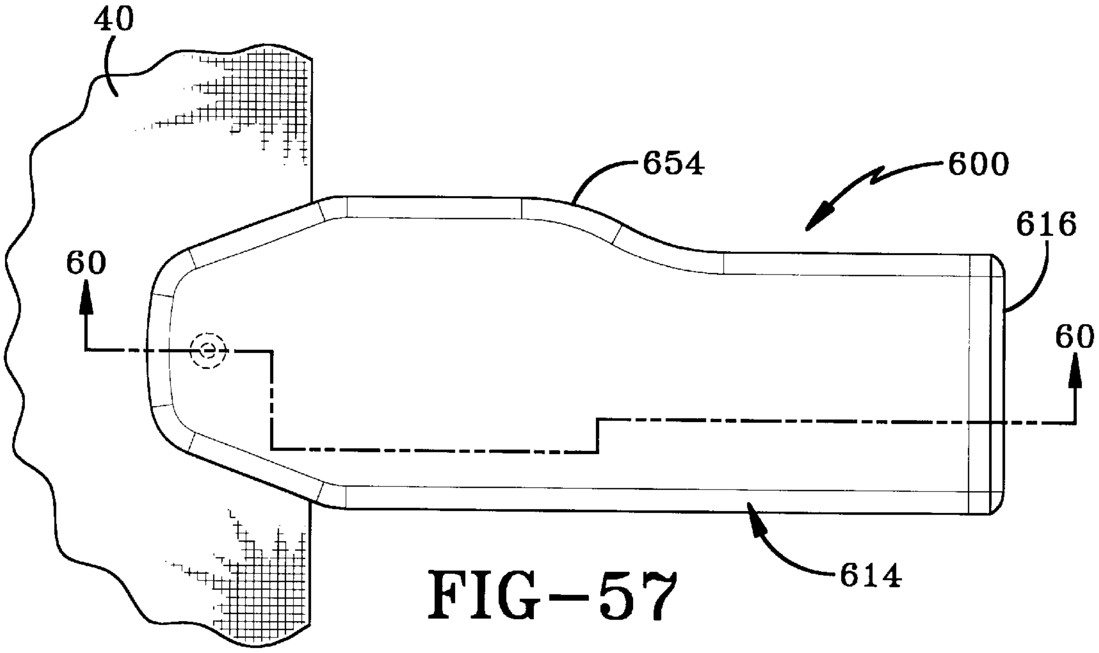
FIG. 57 is a top view of the EAS tag holder of FIG. 54 in a position locked to an item of merchandise.
Figure 58:
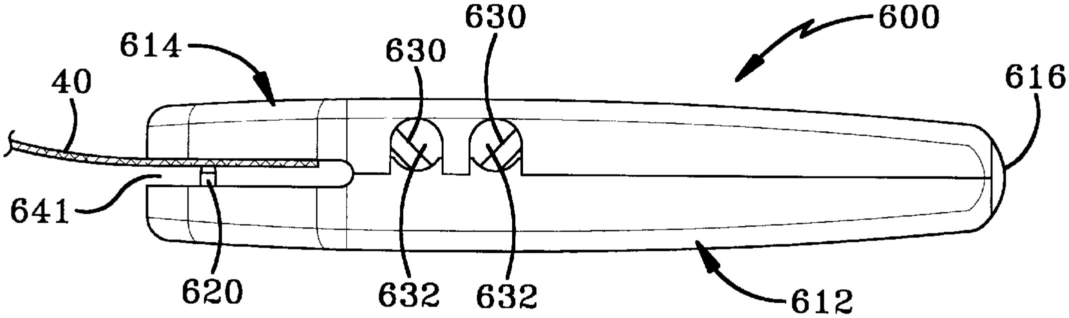
FIG. 58 is a side view of FIG. 57.
Figure 59:
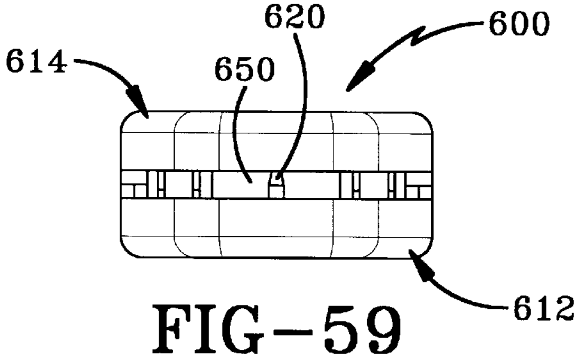
FIG. 59 is a front view of the EAS tag holder with the item of merchandise removed to show the blocking wall of the holder.
Figure 60:
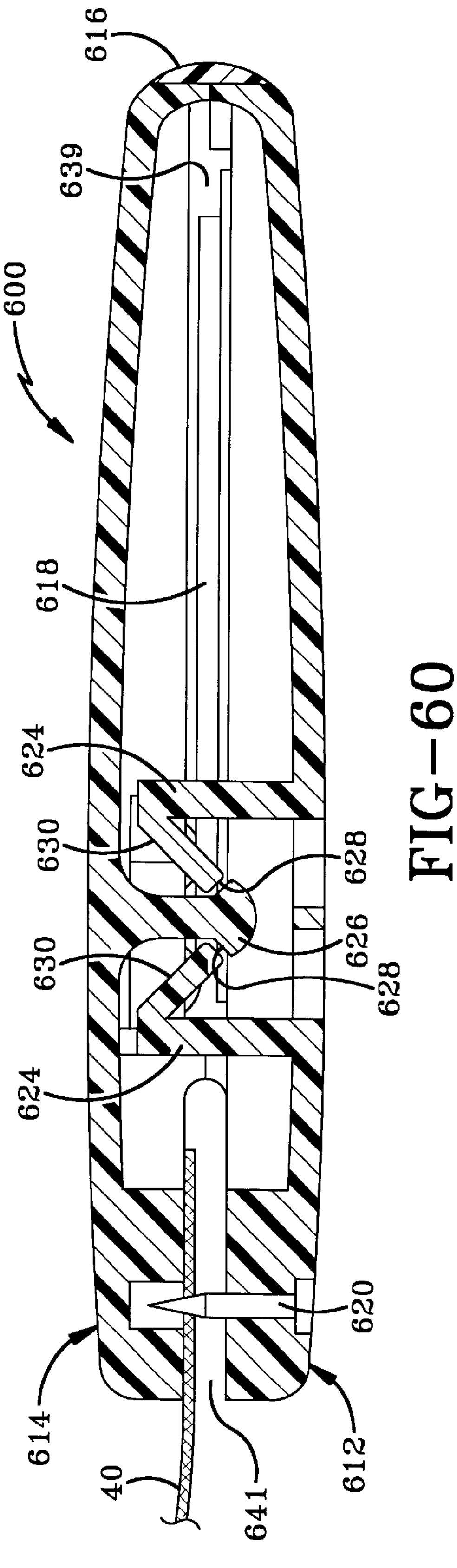
FIG. 60 is a section view taken along line 60—60 of FIG. 57.
Figure 61:
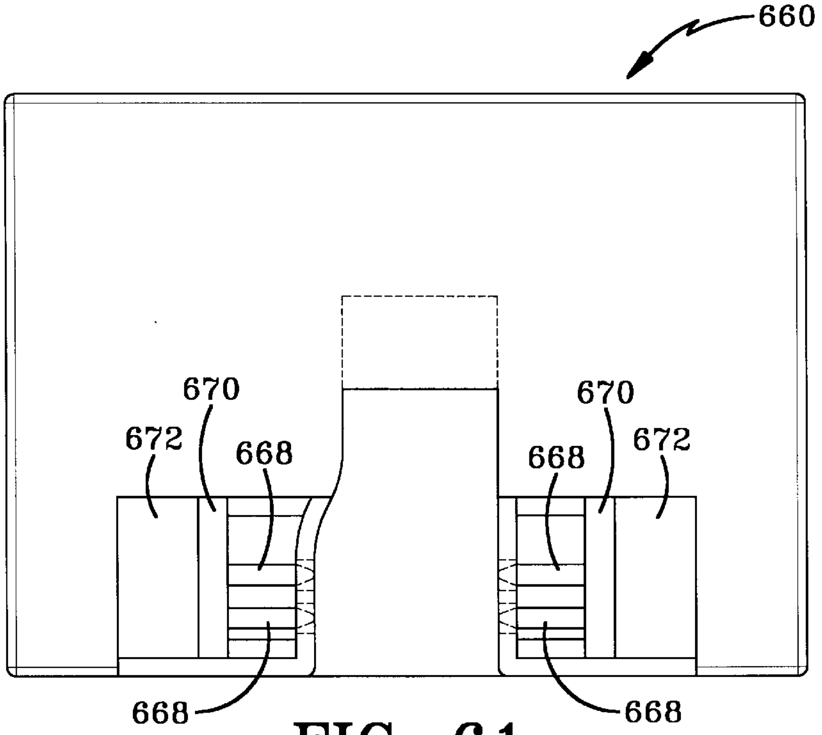
FIG. 61 is a top view of a key that is used to open the fifteenth embodiment of the EAS tag holder.

First locking fingers 624 are attached to member 612 and are configured to cooperate with second locking fingers 626 that are attached to member 614. In the exemplary embodiment of the invention depicted in the drawings, two pairs of locking fingers 624 are attached to first member 612 and a single pair of second locking fingers 626 are attached to second member 614. Each pair of first locking fingers 624 includes two individual first locking fingers 624 that include a first leg that extends away from member 612. In the exemplary embodiment, the first leg is perpendicular to first member 612 as shown in FIG. 55. Each first locking finger 624 also includes a second leg that extends from the first leg. In the exemplary embodiment, the second leg extends from the outer end of the first leg. The second leg extends back toward first member 612 as shown in FIG. 55. The outer end of the second leg forms a locking surface 628 that engages or is positioned immediately adjacent a locking surface 628 on second locking finger 626 when members 612 and 614 are in the closed and locked position as shown in FIG. 60. As also shown in FIG. 60, second locking finger 626 defines two locking surfaces 628 disposed on opposite sides of locking finger 626. First locking fingers 624 thus lock against opposite sides of second locking finger 626 so that second locking finger 626 cannot be moved in either direction (toward either locking finger 624) until both first locking fingers 624 are displaced to an unlocked condition.

In order to allow first locking fingers 624 to be moved to the unlocked position, each first locking finger 624 defines an angled surface 630 that is aligned with a key opening 632. Members 612 and 614 thus define four openings 632. In the exemplary embodiment, openings 632 are disposed at the edges of members 612 and 614 such that a portion of each opening is defined by each member 612 and 614. In other embodiments of the invention, each opening 632 may be entirely defined by one of members 612 or 614.

Each angled surface 630 is configured to cooperate with a key pin 668. When key pin 668 engages surface 630, first locking finger 624 is moved to the unlocked position and locking surfaces 628 disengage from each other to unlock holder 600. The arrangement of locking fingers 624 and 626 require two key pins 668 to be inserted simultaneously to unlock the pair of first locking fingers 624. With the two pairs of locking fingers 624 shown in the drawings, four key pins must be inserted simultaneously to unlock holder 600. Holder 600 is thus difficult for a shoplifter to “pick” because four locking fingers 624 must be moved to the unlocked position in order to open holder 600. Holder 600 thus remains locked when a shoplifter moves one or two locking fingers 624 to the unlocked position. Each finger 624 is sufficiently resilient to return to the locked position once key pin 668 is removed. Locking fingers 624 thus return to the locked condition when key pins 668 are removed. Unless all fingers 624 are in the unlocked condition at the same time (simultaneously in the unlocked position) holder 600 cannot be opened.

Another feature that increases the security of holder 600 is that key openings 632 are disposed on opposite sides of holder 600. The position of key openings 632 and locking fingers 624 require key pins 668 to move perpendicular to the longitudinal direction of holder 600. In this embodiment, key pins 668 must be disposed parallel to the hinge axis of holder 600. The hinge axis is the axis about which the first and second members 612 and 614 pivot with respect to each other. The position of openings 632 also requires key pins 668 to be forced inwardly toward each other in order to unlock holder 600. This configuration makes it difficult for a shoplift to “pick” holder 600 because the shoplifter must manipulate four key pins 668 in different directions from different sides of holder 600.

Hinge 616 is an elongated hinge that connects members 612 and 614 with a pair of spaced living hinges. The living hinges are parallel to each other and define two parallel hinge axes. In other embodiments, a hinge having a single axis may be used. Holder 600 also includes a blocking wall 650 that helps close compartment 639 when members 612 and 614 are locked.

Members 612 and 614 of holder 600 have a non-symmetric outer shape. The shape helps position holder 600 in a key 660. The shape only allows holder 600 to be inserted correctly into key 660. In the exemplary embodiment of the invention, holder 600 is non-symmetric about its longitudinal axis. In other embodiments, holder 600 may be non-symmetric along other axes.

Each member 612 and 614 defines a projection 654 that makes members 612 and 614 non-symmetric. In the exemplary embodiment of the invention, projections 654 extend from the side of holder 600 as shown in FIGS. 54 and 56.

Figure 62:
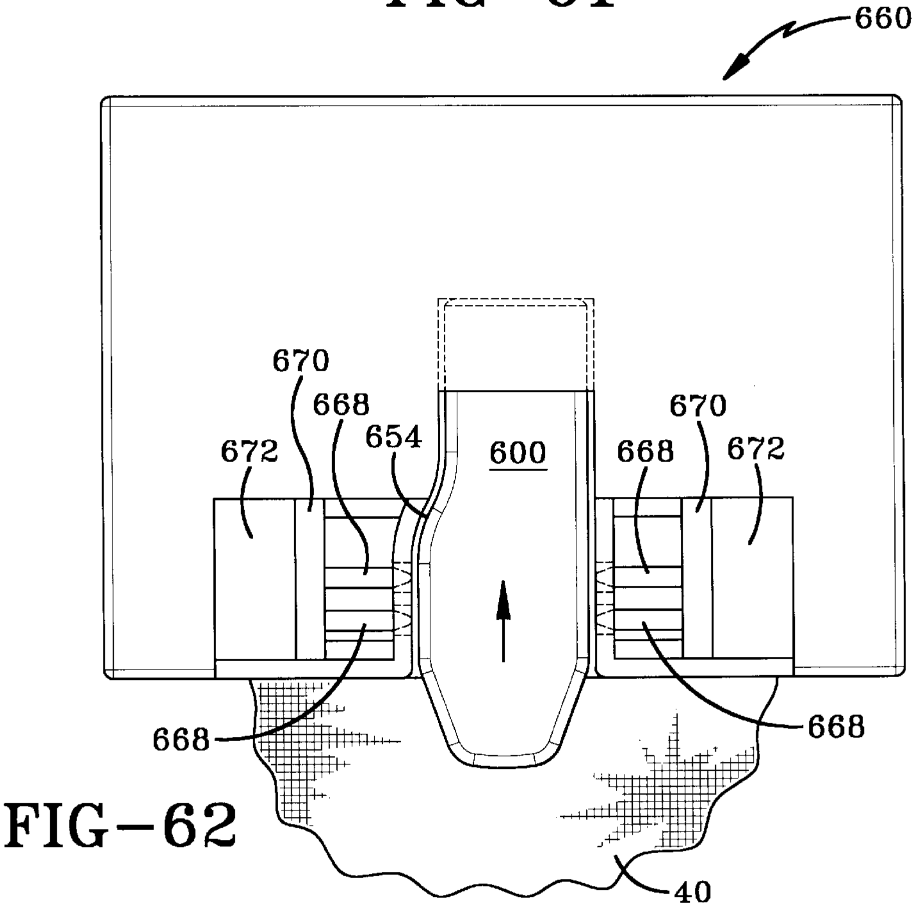
FIG. 62 is a view similar to FIG. 61 with the EAS tag holder inserted into a position where it can be unlocked.
Figure 63:
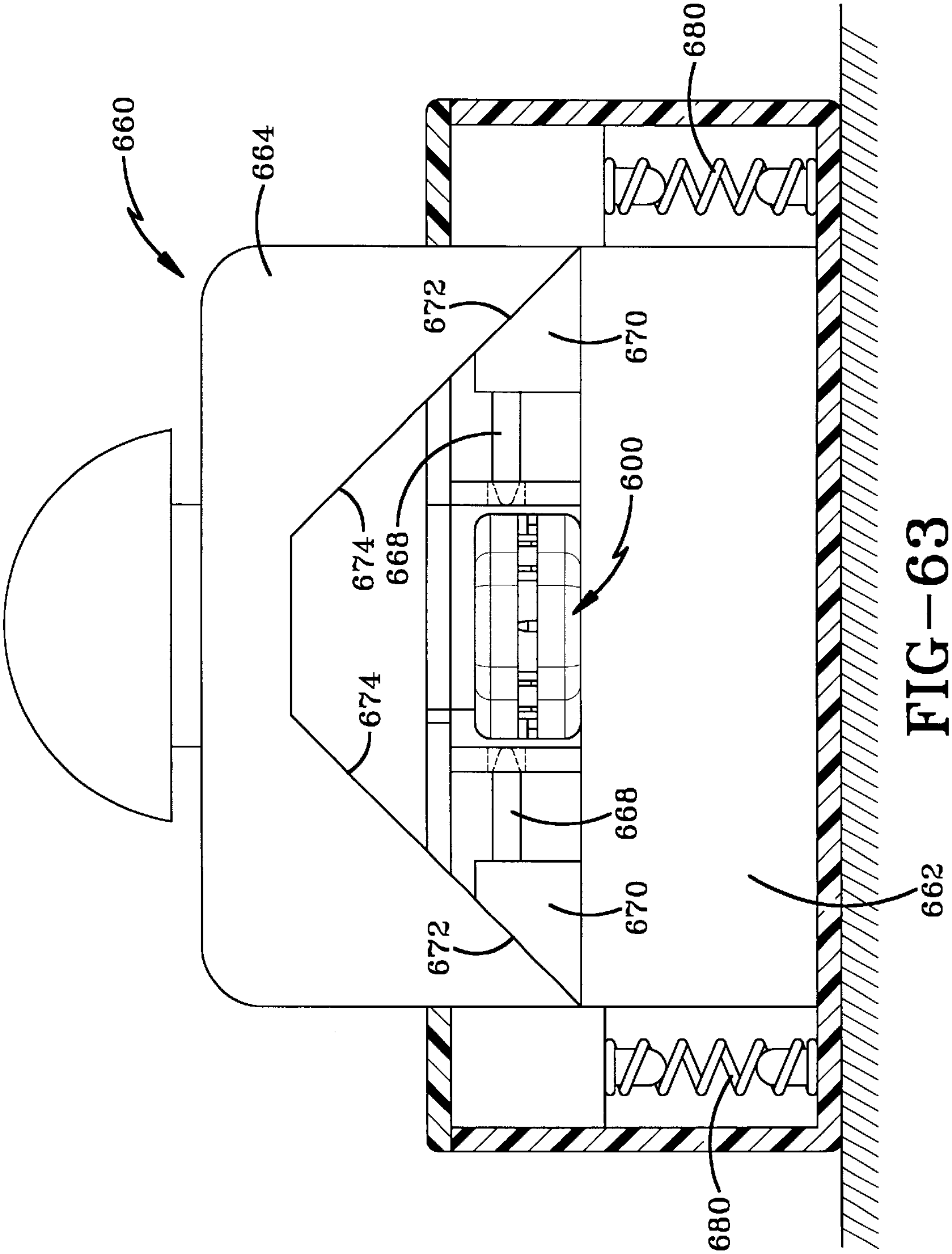
FIG. 63 is a front view, partially in section, of the key with the EAS tag holder inserted into a position where it can be unlocked.
Figure 64:
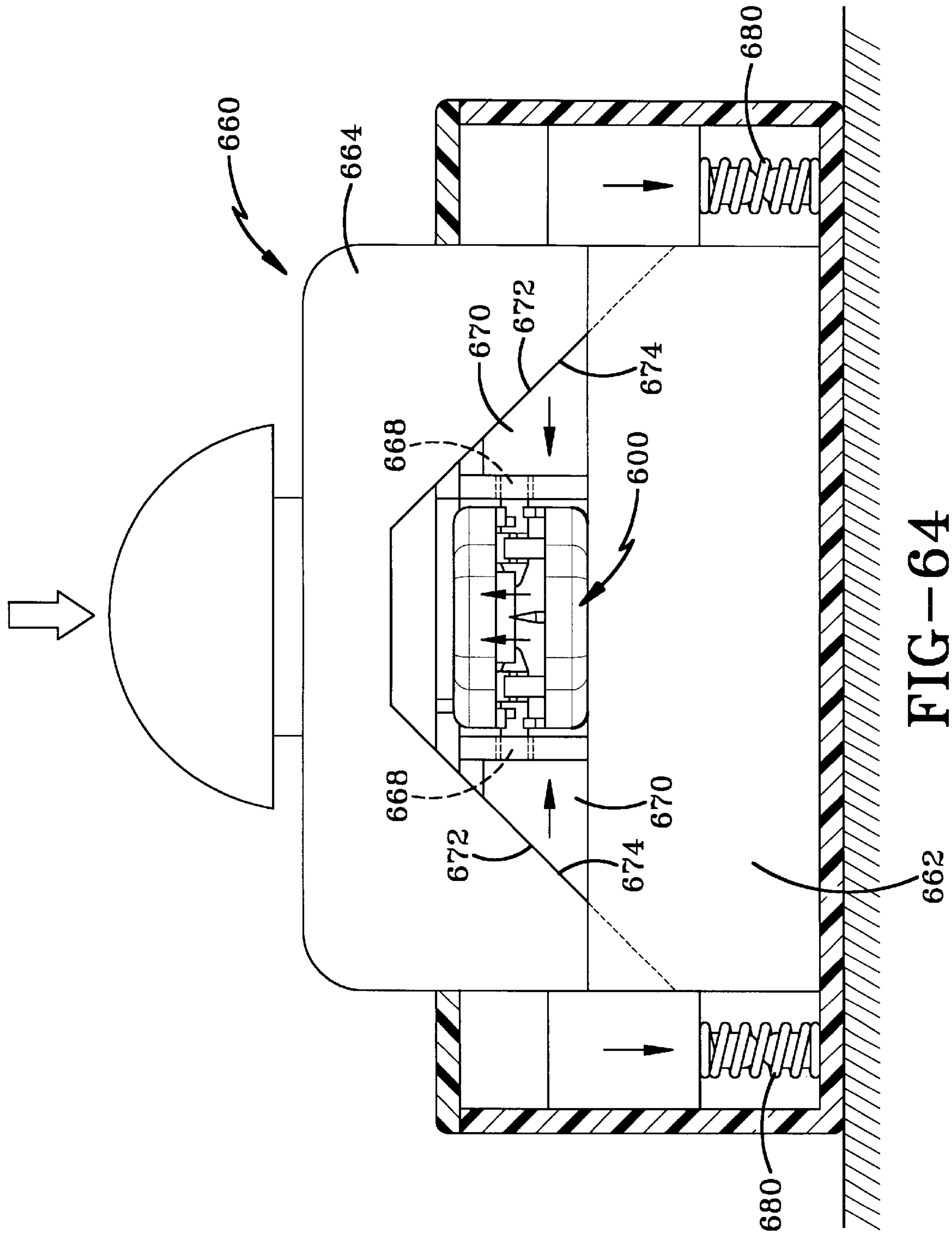
FIG. 64 is a front view, partially in section, of the key depressed to insert the key pins into the EAS tag holder to unlock the EAS tag holder.

Key 660 includes an opening that is configured to receive holder 600 in a position where each opening 632 is aligned with one key pin 668. FIG. 62 shows how holder 600 is inserted into key 660 with openings 632 aligned with key pins 668.

Key 660 includes a base 662 and a plunger 664 that is adapted to be moved from a resting position (FIG. 63) to an unlocking position (FIG. 64) when the user wishes to unlock holder 600. Key pins 668 are carried by blocks 670 that are adapted to slide back and forth with respect to base 662. The upper surface 672 of each block 670 is angled and is positioned to engage an angled surface 674 of plunger 664. When plunger 664 is pushed down, the angled surfaces cooperate and force blocks 670 inwardly toward holder 600. Springs 680 are provided to return plunger 664 to the resting position. Blocks 670 may be connected to plunger 664 such that blocks 670 return to their resting position when plunger 664 returns to its resting position.

The user inserts holder 600 into key as shown in FIG. 62. The shape of holder 600 and key 660 only allows holder 600 to be inserted in the proper orientation for unlocking. After holder 600 is inserted, the user depresses plunger 664 to move pins 668 inwardly to engage and unlock locking fingers 624 allowing holder 600 to be removed from substrate 40. The user then releases plunger 664 and springs 680 return plunger 664 to its resting position where it is ready to open another holder.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

We claim:

1. An electronic article surveillance tag holder used to connect an electronic article surveillance tag to an item of merchandise to discourage shoplifting; the holder comprising:

a first member;

a second member;

an electronic article surveillance tag carried by at least one of the first and second members;

a tooth carried by one of the first and second members; the tooth being adapted to connect the holder to the item of merchandise;

a hinge connecting the first member to the second member; the first and second members movable from an unlocked position to a locked position about the hinge;

a lock adapted to lock the first member to the second member in the locked position; and the lock preventing the first and second members from moving from the locked position to the unlocked position until the hinge is destroyed.

2. The holder of claim 1, wherein the first and second members may slide from the locked position to the unlocked position after the hinge is destroyed.

3. The holder of claim 2, wherein the hinge is adapted to be severed.

4. The holder of claim 2, wherein the tooth has an outer end; the outer end of the tooth being at least partially disposed in a depression defined by the other of the first and second members.

5. The holder of claim 4, wherein the depression is elongated to allow the tooth to slide with respect to the depression when the first and second members slide from the locked position to the unlocked position after the hinge is destroyed.

6. The holder of claim 1, wherein the lock includes at least one first locking finger and at least one second locking finger; the first and second locking fingers locking to each other when the first and second members are moved to the locked position.

7. The holder of claim 6, wherein the tooth is separate and spaced apart from the locking fingers.

8. The holder of claim 6, wherein one of the first and second locking fingers includes a blocking wall adapted to prevent the first and second locking fingers from sliding in the wrong direction.

9. The holder of claim 1, wherein the lock includes a ratchet that allows the position of the first and second members to be adjusted.

10. An electronic article surveillance tag holder used to connect an electronic article surveillance tag to an item of merchandise to discourage shoplifting: the holder comprising:

a first member;

a second member;

a hinge connecting the first member to the second member; the first and second members pivotable from an unlocked position to a locked position about a first axis;

a lock adapted to lock the first member to the second member in the locked position;

the lock being configured to be unlocked by key pins disposed substantially parallel to the first axis;

a key configured to unlock the holder; the key including a key pins adapted to engage and unlock the lock; the key pins movable with a plunger that is movable between resting and unlocking positions; and the key pins move toward each other when the plunger is moving from the resting position toward the unlocking position.

11. An electronic article surveillance tag holder used to connect an electronic article surveillance tag to an item of merchandise to discourage shoplifting; the holder comprising:

a first member;

a second member;

a hinge connecting the first member to the second member; the first and second members pivotable from an unlocked position to a locked position about a first axis;

a lock adapted to lock the first member to the second member in the locked position;

the lock being configured to be unlocked by key pins disposed substantially parallel to the first axis;

a key configured to unlock the holder; the key including a key pins adapted to engage and unlock the lock; the key pins movable with a plunger that is movable between resting and unlocking positions; and a tooth carried by one of the first and second members; the tooth being adapted to connect the holder to the item of merchandise.

12. An electronic article surveillance tag holder used to connect an electronic article surveillance tag to an item of merchandise to discourage shoplifting; the holder comprising:

a first member;

a second member;

an electronic article surveillance tag carried by at least one of the first and second members;

a hinge connecting the first member to the second member; the first and second members pivotable from an unlocked position to a locked position about a first axis;

a lock adapted to lock the first member to the second member in the locked position; and the lock being configured to be unlocked by at least one key pin disposed substantially parallel to the first axis.

13. The holder of claim 12, the first and second members define a body of the holder; the body being non-symmetric.

14. The holder of claim 13, wherein the body has a longitudinal axis; the body being non-symmetric about the longitudinal axis of the body.

15. The holder of claim 12, further comprising a tooth carried by one of the first and second members; the tooth being adapted to connect the holder to the item of merchandise.

16. The holder of claim 15, wherein the tooth is spaced from the lock.

17. The holder of claim 12, wherein the lock includes at least two spaced locking fingers; the holders having opposite sides that define openings adapted to receive key pins to engage the locking fingers.

18. The holder of claim 17, wherein the lock includes four first locking fingers and two second locking fingers; two of the first locking fingers engaging each of the second locking fingers.

19. The holder of claim 18, wherein each of the second locking fingers has opposite sides; the first locking fingers engaging the opposite sides of the second locking finger.

20. The holder claim 19, of wherein each first locking finger includes a first leg and a second leg; the second leg defining a locking surface that engages the second locking finger when the first and second members are in the locked position.

21. The holder of claim 20, wherein the first and second legs of each first locking finger form an acute angle.

22. The holder of claim 17, wherein a portion of the electronic article surveillance tag is disposed between the two spaced locking fingers.

23. The holder of claim 12, in combination with a key configured to unlock the holder; the key including a key pins adapted to engage and unlock the lock; the key pins movable with a plunger that is movable between resting and unlocking positions.

24. The holder of claim 13, wherein the first and second members define a body of the holder; the body being non-symmetric so that the body may only be inserted into the key in one direction.

25. The holder of claim 23, wherein the holder has opposite sides that define openings adapted to receive the key pins.

26. The holder of claim 12, wherein the lock must be engaged by at least two key pins simultaneously to unlock the lock.

27. An electronic article surveillance tag holder used to connect an electronic article surveillance tag to an item of merchandise to discourage shoplifting; the holder comprising:

a first member;

a second member;

an electronic article surveillance tag carried by at least one of the first and second members;

a lock adapted to lock the first member to the second member in the locked position;

the lock including four first locking fingers and two second locking fingers; two of the first locking fingers engaging each of the second locking fingers; and the holder having opposed sides that defining openings that allow access to the four first locking fingers.

28. The holder of claim 27, wherein a portion of the electronic article surveillance tag is disposed between the two second locking fingers.

29. The holder of claim 27, wherein each of the second locking fingers has opposite sides; the first locking fingers engaging the opposite sides of the second locking finger.

30. The holder of claim 29, wherein each first locking finger includes a first leg and a second leg; the second leg defining a locking surface that engages the second locking finger when the first and second members are in the locked position.

31. The holder of claim 30, wherein the first and second legs of each first locking finger form an acute angle.

32. The holder of claim 27, further comprising a tooth carried by one of the first and second members; the tooth being adapted to connect the holder to the item of merchandise.

33. The holder of claim 32, wherein the tooth is spaced from the lock.

34. The holder of claim 27, further comprising a key configured to unlock the holder; the key including two opposed pairs of key pins adapted to engage and unlock the lock; the opposed pairs of key pins movable between resting and unlocking positions; and the opposed pairs of key pins move toward each other from the resting position toward the unlocking position.

35. The holder of claim 34, wherein the key pins simultaneously engage all four first locking fingers to unlock the holder.

36. The holder of claim 27, wherein the first and second members define a body of the holder; the body being non-symmetric.

37. The holder of claim 36 wherein the body has a longitudinal axis; the body being non-symmetric about the longitudinal axis of the body.

38. The holder of claim 37, combination with a key configured to unlock the holder; the key including a key pins adapted to engage and unlock the lock.

39. The holder of claim 38, wherein the first and second members define a body of the holder; the body being non-symmetric so that the body may only be inserted into the key in one direction.

40. The holder of claim 39, wherein the key pins are movable with a plunger that is movable between resting and unlocking positions.

* * * * *